(12) United States Patent
Zhu et al.

(10) Patent No.: US 12,484,111 B2
(45) Date of Patent: Nov. 25, 2025

(54) BEARER CONFIGURATION METHOD AND DEVICE

(71) Applicant: ZTE CORPORATION, Shenzhen (CN)

(72) Inventors: Hao Zhu, Shenzhen (CN); Lin Chen, Shenzhen (CN); Tao Qi, Shenzhen (CN); Zijiang Ma, Shenzhen (CN); Feng Xie, Shenzhen (CN); Ying Huang, Shenzhen (CN); Kun Cao, Shenzhen (CN); Liping Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 386 days.

(21) Appl. No.: 17/921,938

(22) PCT Filed: Mar. 4, 2021

(86) PCT No.: PCT/CN2021/079117
§ 371 (c)(1),
(2) Date: Jan. 20, 2023

(87) PCT Pub. No.: WO2021/218375
PCT Pub. Date: Nov. 4, 2021

(65) Prior Publication Data
US 2023/0180349 A1 Jun. 8, 2023

(30) Foreign Application Priority Data
Apr. 27, 2020 (CN) .......................... 202010345823.3

(51) Int. Cl.
*H04H 20/71* (2008.01)
*H04W 76/40* (2018.01)

(52) U.S. Cl.
CPC .................................. *H04W 76/40* (2018.02)

(58) Field of Classification Search
USPC .......................................................... 370/312
See application file for complete search history.

(56) References Cited

U.S. PATENT DOCUMENTS

2005/0282569 A1   12/2005  Kim et al.
2006/0146858 A1*  7/2006   Kim ..................... H04W 72/30
                                                 370/465
(Continued)

FOREIGN PATENT DOCUMENTS

CN    101155328 A    4/2008
CN    101166306 A    4/2008
(Continued)

OTHER PUBLICATIONS

International Search Report in Application No. PCT/CN2021/079117, dated May 27, 2021, 6 pages, including English translation.
(Continued)

*Primary Examiner* — Chuong T Ho
(74) *Attorney, Agent, or Firm* — Morgan, Lewis & Bockius LLP

(57) ABSTRACT

Provided are a bearer configuration method and apparatus, a context message management method and apparatus, a releasing method and apparatus, a device, and a storage medium. The bearer configuration method includes receiving first information and configuring a radio bearer of an MBS based on the first information. The radio bearer includes a point-to-point (PTP) bearer and/or a point-to-multipoint (PTM) bearer.

13 Claims, 6 Drawing Sheets

(56) References Cited

U.S. PATENT DOCUMENTS

| | | | |
|---|---|---|---|
| 2009/0219850 A1 | 9/2009 | Lin et al. | |
| 2014/0029580 A1* | 1/2014 | Jung | H04W 36/0066 370/331 |
| 2017/0013433 A1 | 1/2017 | Lee et al. | |
| 2021/0068004 A1* | 3/2021 | Kadiri | H04L 47/15 |
| 2021/0204248 A1* | 7/2021 | Zhang | H04W 4/06 |
| 2023/0199569 A1* | 6/2023 | Cao | H04W 4/06 370/331 |

FOREIGN PATENT DOCUMENTS

| | | |
|---|---|---|
| CN | 101350949 A | 1/2009 |
| CN | 101351036 A | 1/2009 |
| CN | 102404691 A | 4/2012 |
| CN | 102595328 A | 7/2012 |
| CN | 108260162 A | 7/2018 |
| CN | 110447146 A | 11/2019 |
| CN | 111901766 A | 11/2020 |
| KR | 20190089955 A | 7/2019 |

OTHER PUBLICATIONS

Mikko Säily et al: "Broadcast and Multicast Communication Enablers for the Fifth-Generation of Wireless Systems Deliverable D3.4 Rat Protocols and Radio Resource Management in 5G-Xcast", Jul. 31, 2019 (Jul. 31, 2019), XP055685218, Retrieved from the Internet: URL: http://5g-xcast.eu/wp-content/uploads/2019/07/5G-Xcast_WP3_D3.4_v3.0.pdf [retrieved on Apr. 14, 2020].

David Vargas et al: "RAN Logical Architecture and Interfaces for 5G-Xcast", Feb. 28, 2019 (Feb. 28, 2019), pp. 1-95, XP055646813, Retrieved from the Internet: URL: http://5g-xcast.eu/wp-content/uploads/2019/03/5G-Xcast_D3.3_v2.0_web.pdf [retrieved on Nov. 27, 2019].

Partial European Search Report for Application No. 21797922.8, dated Jul. 28, 2023, 12 pages.

Korean Office Action for Application No. 1020227041348, Sep. 28, 2023, 14 pages including translation.

First Office Action in European Application No. 21797922.8, dated Jan. 20, 2025, 6 pages.

3GPP, "Technical Specification Group Radio Access Network; Introduction of the Multimedia Broadcast/Multicast Service (MBMS) in the Radio Access Network (RAN); Stage 2 (Release 15)", Jun. 29, 2018 (Jun. 29, 2018), XP051589510, Retrieved from the Internet: URL:http://www.3gpp.org/ftp/tsg%5Fran/WG6%5FlegacyRAN/TSGR6%5F08/Implemented%20specs%20after%20TSG%20RAN%5F80/Upgraded%20specs%20from%20Rel%2D14%20to%20Rel%2D15/25346%2Df00%2Ezip First Office Action in Chinese Application No. 202010345823.3, dated Jul. 10, 2025, 26 pages, including translation.

* cited by examiner

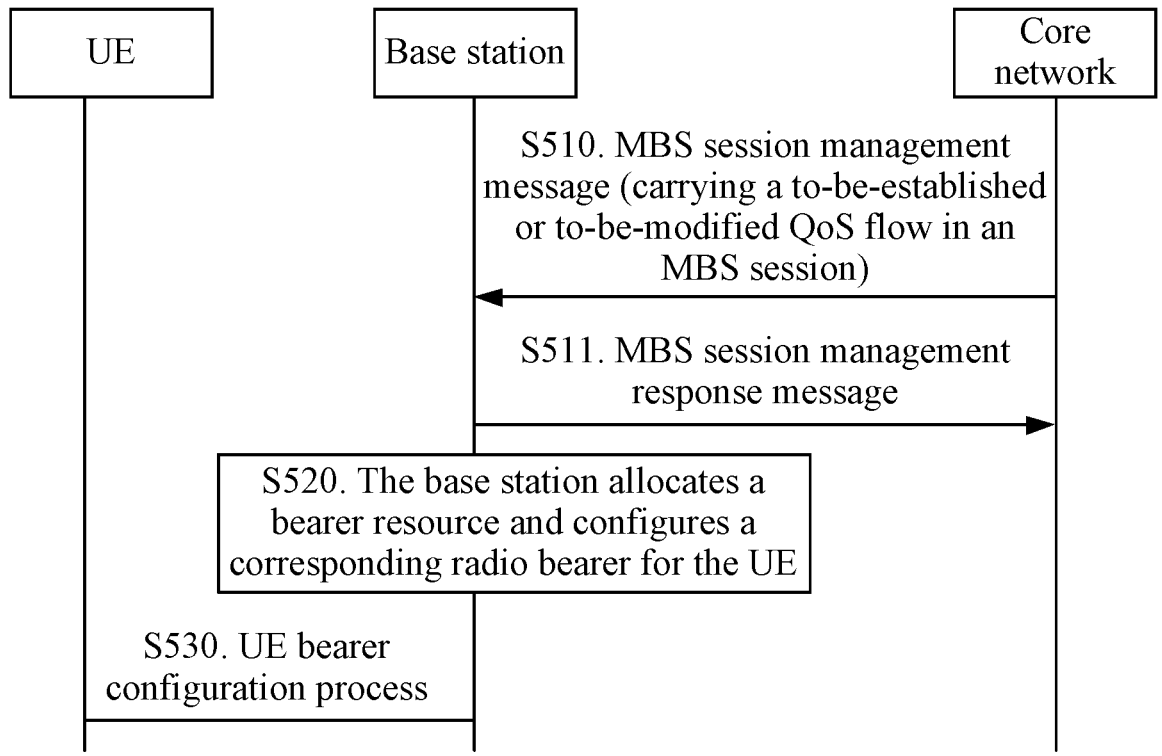

BEARER CONFIGURATION METHOD AND DEVICE

CROSS REFERENCE TO RELATED APPLICATIONS

This is a National Stage Application filed under 35 U.S.C. 371, based on International Patent Application No. PCT/CN2021/079117, filed on Mar. 4, 2021, which claims priority to Chinese Patent Application No. 202010345823.3 filed with the China National Intellectual Property Administration (CNIPA) on Apr. 27, 2020, the disclosures of which are incorporated herein by reference in their entireties.

TECHNICAL FIELD

The present application relates to the field of radio communication networks, for example, a bearer configuration method and apparatus, a context information management method and apparatus, a releasing method and apparatus, a device, and a storage medium.

BACKGROUND

The 5th generation mobile communication technology (5G)-related technologies are mainly related to a unicast service scenario, that is, a point-to-point (PTP) service mode. The solution of a point-to-multipoint (PTM) service mode does not emerge. In addition, with the rapid increase in the number of users and the multi-dimension of application scenarios, the point-to-multipoint service mode inevitably becomes one of the indispensable service modes. The problem of how to reasonably and effectively implement a multicast broadcast service under the technical framework of 5G new radio access technology (NR) is urgent to be solved.

SUMMARY

The present application provides a bearer configuration method and apparatus, a context information management method and apparatus, a releasing method and apparatus, a device, and a storage medium.

An embodiment of the present application provides a bearer configuration method. The method is applied to a first communication node and includes the following: first information is received; and a radio bearer of a multicast broadcast service (MBS) is configured based on the first information, where the radio bearer includes a point-to-point (PTP) bearer and/or a point-to-multipoint (PTM) bearer.

An embodiment of the present application further provides a context message management method. The method is applied to a second communication node and includes the following: a context request message of a first communication node is sent, where the context request message includes a context establishment request message and a context modification request message; and a radio bearer of an MBS session is managed based on the context request message.

An embodiment of the present application further provides a releasing method. The method includes the following: in the case where a releasing condition is satisfied, a radio bearer associated with an MBS session is released; and a service data adaptation protocol (SDAP) entity is released, where the releasing condition includes one or more of the following: the MBS session ends; and first information is received, where the first information carries an identifier of a to-be-released radio bearer.

An embodiment of the present application further provides a bearer configuration apparatus. The apparatus is configured at a first communication node and includes a receiving module and an establishment modification module.

The receiving module is configured to receive first information. The establishment modification module is configured to configure a radio bearer of an MBS based on the first information. The radio bearer includes a point-to-point (PTP) bearer and/or a point-to-multipoint (PTM) bearer. The configuration includes one or more of the following: establishment, modification, and release.

An embodiment of the present application further provides a context message management apparatus. The apparatus is configured at a second communication node and includes a first sending module and a management module.

The first sending module is configured to send a context request message of a first communication node. The context request message includes a context establishment request message and a context modification request message. The management module is configured to manage a radio bearer of an MBS session based on the context request message.

An embodiment of the present application further provides a radio bearer releasing apparatus. The apparatus includes a first releasing module and a second releasing module.

The first releasing module is configured to, in the case where a releasing condition is satisfied, release a radio bearer associated with an MBS session. The second releasing module is configured to release an SDAP entity. The releasing condition includes one or more of the following: the MBS session ends; and first information is received. The first information carries an identifier of a to-be-released radio bearer.

An embodiment of the present application further provides a device. The device includes one or more processors and a memory configured to store one or more programs.

The one or more programs, when executed by the one or more processors, cause the one or more processors to perform any method according to embodiments of the present application.

An embodiment of the present application further provides a storage medium. The storage medium stores a computer program. The computer program, when executed by a processor, implements any method according to the embodiments of the present application.

BRIEF DESCRIPTION OF DRAWINGS

FIG. 4 is a flowchart of a releasing method according to an embodiment of the present application.

FIG. 5 is a flowchart of a control plane where a base station configures a UE with a radio bearer for an MBS.

DETAILED DESCRIPTION

Embodiments of the present application are described below in conjunction with drawings.

The steps illustrated in the flowcharts among the drawings may be performed by, for example, a computer system capable of executing a set of computer-executable instructions. Moreover, although the logical order is illustrated in the flowchart, in some cases, the illustrated or described steps may be performed in an order different from the order described herein.

The technical schemes of the present application may be applied to such communications systems as Global Systems for Mobile Communications (GSMs), code-division multiple access (CDMA) systems, wideband code-division multiple access (WCDMA) systems, General Packet Radio Services (GPRSs), Long Term Evolution (LTE) systems, Long Term Evolution Advanced (LIE-A) systems, Universal Mobile Telecommunications Systems (UMTSs) and the 5th generation mobile communication technology (5G) systems. These are not limited in the embodiments of the present application. In the present application, a 5G system is used as an example.

Figure 1:
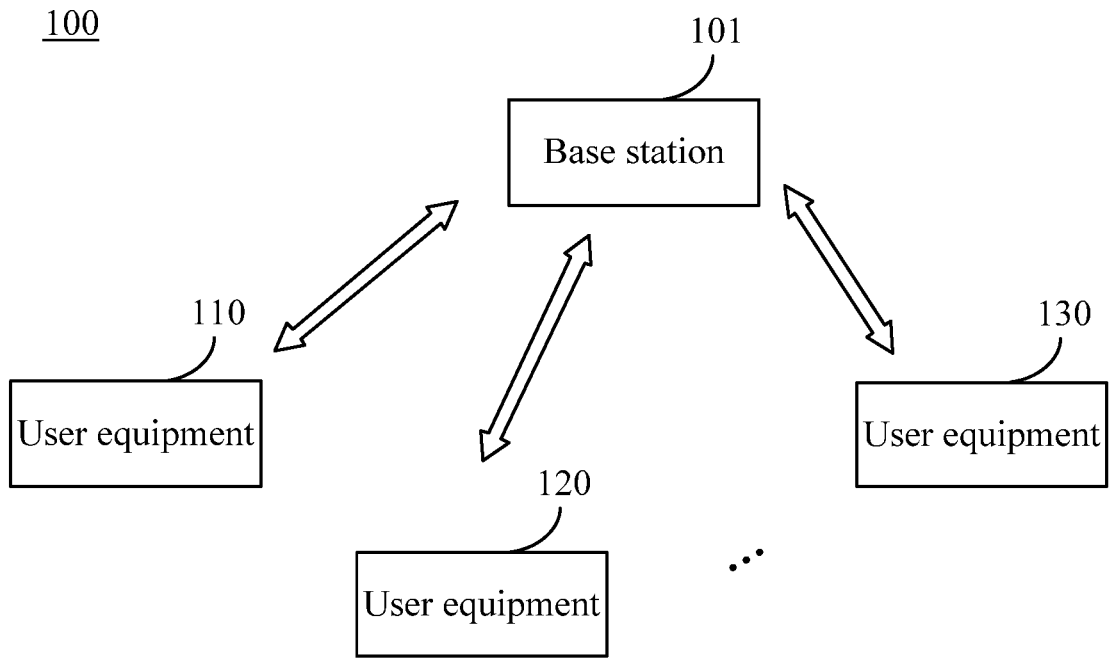
FIG. 1 is a diagram illustrating the structure of a radio network system according to an embodiment of the present application.

The embodiments of the present application may be applied to radio networks of different standards. Radio access networks may include different communication nodes in different systems. FIG. 1 is a diagram illustrating the structure of a radio network system according to an embodiment of the present application. As shown in FIG. 1, a radio network system 100 includes a base station 101, a user equipment 110, a user equipment 120, and a user equipment 130. The base station 101 performs radio communication with the user equipment 110, the user equipment 120 and the user equipment 130, separately.

First, in this embodiment of the present application, the base station may be a device capable of communicating with a user terminal. The base station may be any device having a radio transceiving function. The base station includes, but is not limited to, a NodeB, an evolved NodeB (eNodeB), a base station in the 5G communication system, a base station in a future communication system, an access node in a Wireless Fidelity (Wi-Fi) system, a wireless relay node, and a wireless backhaul node. The base station may also be a radio controller in cloud radio access network (C-RAN) scenarios. The base station may also be a Small Cell and a transmission node (transmission reference point (TRP)). This is not limited in this embodiment of the present application.

In this embodiment of the present application, the user terminal is a device having a radio transceiving function. The device may be deployed on land including indoors, outdoors, handled, wearable or vehicle-mounted, may be deployed on water (for example, on a ship), or may be deployed in the air (for example, on an airplane, balloon, or satellite). The user terminal may be a mobile phone, a tablet computer (Pad), a computer having a radio transceiving function, a virtual reality (VR) terminal, an augmented reality (AR) terminal, a radio terminal in industrial control, a radio terminal in self-driving, a radio terminal in remote medicine, a radio terminal in a smart grid, a radio terminal in transportation safety, a radio terminal in a smart city, and a radio terminal in a smart home. Application scenarios are not limited in this embodiment of the present application. The user terminal may also be sometimes called a terminal, an access terminal, a UE unit, a UE station, a mobile station, a mobile platform, a remote station, a remote terminal, a mobile equipment, a UE terminal, a radio communication device, a UE agent, or a UE apparatus. This is not limited in this embodiment of the present application.

With the continuous development of 5G technology, 5G schemes for various application scenarios accelerate the integration. A multicast broadcast service scenario is a traditional service scenario that exists to satisfy the requirements of most users for the same type of service. 5G-related technologies are mainly related to a unicast service scenario, that is, a point-to-point (PTP) service mode. The standardized discussion of a point-to-multipoint (PTM) service mode is not commenced. In addition, with the rapid increase in the number of users and the multi-dimension of application scenarios, the point-to-multipoint service mode inevitably becomes one of the indispensable service modes. Therefore, the problem of how to reasonably and effectively implement a multicast broadcast service under the technical framework of 5G NR is urgent to be discussed and solved.

Mobile networks may be divided into a core network, a radio access network (base station), and a user equipment (UE). The bearer between the radio access network and the user equipment is referred to as a radio bearer (RB). In the third-generation mobile network and fourth-generation mobile network, the user equipment in a cellular cell may receive a multicast broadcast service through the radio bearer of a point-to-multipoint (PTM) mode. If a specific user equipment desires to establish the radio bearer of a point-to-point (PTP) mode, a network needs to provide the user equipment with a point-to-point bearer between network elements such as core network elements, radio access network elements, and user equipment. Which mode of the bearer that the user equipment establishes needs to be determined by the core network.

Figure 2:
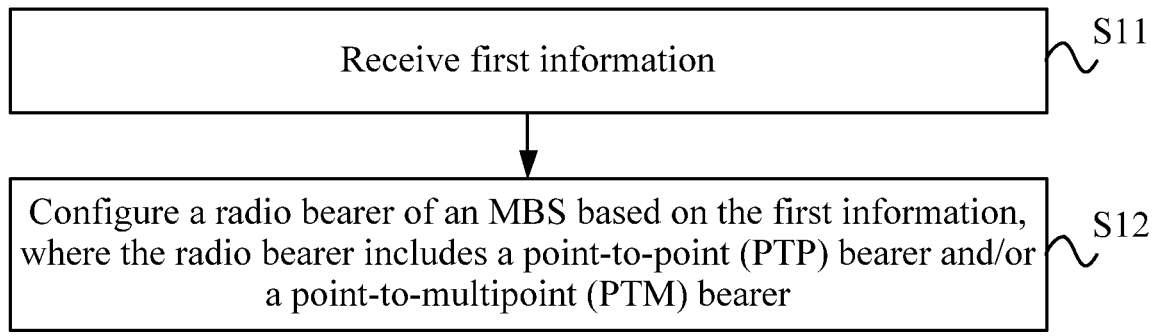
FIG. 2 is a flowchart of a bearer configuration method according to an embodiment of the present application.

In an embodiment, the present application provides a bearer configuration method. FIG. 2 is a flowchart of a bearer configuration method according to an embodiment of the present application. The method may be applicable to the case where a user establishes and modifies a radio bearer. This method may be executed by a bearer configuration apparatus provided by the present application. This bearer configuration apparatus may be performed by software and/or hardware. The method is applied to a first communication node.

As shown in FIG. 2, the bearer configuration method provided by this embodiment of the present application includes S11 and S12.

In S11, first information is received.

In S12, a radio bearer of a multicast broadcast service (MBS) is configured based on the first information, where the radio bearer includes a point-to-point (PTP) bearer and/or a point-to-multipoint (PTM) bearer. The configuration includes one or more of the following: establishment, modification, and release.

In the present application, the point-to-point (PTP) bearer may refer to a unicast bearer and may be understood as a bearer used when a base station sends data to a single first communication node (for example, a UE). The point-to-multipoint (PTM) bearer may refer to a multicast or broadcast bearer and may be understood as a bearer used when the base station sends data to a group of first communication nodes or all first communication nodes in a cell.

There are two modes of communication between the base station and the first communication node. One is a PTP mode, and the other is a PTM mode. The PTP mode represents a point-to-point communication mode used between the first communication node and the base station. The bearer of the PTP mode may be a data radio bearer (DRB), a unicast RB, a PTP radio bearer, or a PTP bearer. The PTM mode represents a point-to-multipoint communication mode used between the first communication node and the base station. The bearer of the PTM mode may be a multicast RB, a broadcast RB, a PTM radio bearer, or a PTM bearer.

In this embodiment, the first communication node may be any user equipment described in the preceding system and is merely illustrated in this embodiment and not limited thereto.

The first information is sent by the base station to the user equipment. The base station may be any one of the base stations described in the preceding system and is merely illustrated in this embodiment and not limited thereto.

In an exemplary implementation, the first information includes PTP bearer configuration information. The PTP bearer is configured based on the PTP bearer configuration information. The PTP bearer configuration information includes one or more of the following pieces of information: a PTP radio bearer identifier, service data adaptation protocol (SDAP) configuration information, packet data convergence protocol (PDCP) configuration information, and radio link control (RLC) bearer configuration information.

In an exemplary implementation, the first information includes second information. The PTM bearer is configured based on the second information. The second information includes one or more of the following: an identifier information list of ongoing MBSs, MBS identifier information, scheduling information corresponding to each piece of MBS identifier information, a radio network temporary identifier for a broadcast/multicast service, scheduling information of a multicast service channel, a physical layer parameter required for configuring the multicast service channel, and second bearer configuration.

The second bearer configuration includes one or more of the following: a PTM radio bearer identifier, a logical channel identifier (LCD), SDAP configuration information, PDCP configuration information, and RLC bearer configuration information.

In this embodiment, PTM bearer configuration information includes one or more of the following: first bearer configuration and second bearer configuration. The first bearer configuration uses default configuration. The second bearer configuration is acquired from the received second information.

In an exemplary implementation, the SDAP configuration information includes one or more of the following: an indication indicating whether the radio bearer is a default radio bearer; an indication indicating whether downlink data on the radio bearer has an SDAP header; an indication indicating whether uplink data on the radio bearer has an SDAP header; MBS identifier information; an uplink quality of service (QoS) flow list, in an MBS session, that is to be mapped to the radio bearer and to be added; and a to-be-released QoS flow list, in an MBS session, that has been mapped to the radio bearer.

In an exemplary implementation, the MBS identifier information includes one or more of the following: an MBS session identifier, a temporary mobile group identity (TMGI) of the multicast broadcast service, a multicast broadcast service identifier, and a protocol data unit (PDU) session identifier indicating the MBS session.

In an exemplary implementation, in the case where SDAP configuration includes PDU session identifier information, an association between a PDU session and the MBS session in the SDAP configuration is established.

In an exemplary implementation, in the case where the PTP bearer configuration information carries the SDAP configuration information, one or more of the following operations are performed: a first SDAP entity is established; the first SDAP entity is configured based on the carried SDAP configuration information; and an association between the first SDAP entity and a radio bearer corresponding to the PTP radio bearer identifier is established. The first SDAP entity is configured to map a QoS flow in the MBS identifier information to a PTP radio bearer.

In an exemplary implementation, the first bearer configuration includes one or more of the following pieces of information: a PTM radio bearer identifier, a logical channel identifier, SDAP configuration, PDCP configuration, and RLC configuration.

In an exemplary implementation, in the case where the PTM bearer configuration information includes the SDAP configuration information, one or more of the following operations are performed: a second SDAP entity is established; the second SDAP entity is configured based on the SDAP configuration information of the first bearer configuration and/or the second bearer configuration; and an association between the second SDAP entity and the radio bearer corresponding to the PTP radio bearer identifier is established. The second SDAP entity is configured to map the QoS flow in the MBS identifier information to a PTP radio bearer.

In an exemplary implementation, in the case where the PTP bearer configuration information includes the SDAP configuration information, or the PTM bearer configuration information includes the SDAP configuration information, one or more of the following operations are performed: a third SDAP entity is established; the third SDAP entity is configured based on the SDAP configuration information; and an association between the third SDAP entity and the radio bearer corresponding to the PTP radio bearer identifier or a radio bearer corresponding to the PTM radio bearer identifier is established. The third SDAP entity is configured to map the QoS flow in the MBS identifier information to the PTP radio bearer or the PTM radio bearer.

In an exemplary implementation, the PDCP configuration information includes one or more of the following: indicating whether an encryption algorithm is used, timing of discarding a PDCP data packet, whether a PDCP entity continues or resets a robust header compression (ROHC) protocol in the case of reestablishment, header compression configuration, whether the radio bearer is configured with integrity protection, the maximum value of a header compression context identifier (CID) parameter, a PDCP entity being associated with more than one RLC entity in uplink data transmission, allowing out-of-order, whether an uplink PDCP duplication is configured and activated, a downlink PDCP sequence number size, an uplink PDCP sequence number size, indicating a cell group ID and the LCD corresponding to a main RLC entity when more than one RLC entity is associated in the uplink data transmission, whether the radio bearer is configured to transmit a PDCP status report, reordering time, and a data volume threshold when uplink data uses a split bearer.

In an exemplary implementation, the RLC bearer configuration information includes LCID, a radio bearer identifier served by an RLC bearer, a logical channel identifier, RLC configuration, logical channel configuration, an identifier indicating whether to reestablish RLC, the maximum number of retransmissions, the number of poll bytes, a poll PDU, a sequence number (SN)-field length, a timer in an RLC acknowledged mode (AM), a reassembly timer, and a status report timer.

In an exemplary implementation, the first information is radio resource control (RRC) information, or the first information is broadcast information.

All QoS flows of one piece of MBS identifier information are mapped to one PTM radio bearer. Different PTM radio bearers corresponding to different pieces of MBS identifier information use the same logical channel identifier.

In an exemplary implementation, all QoS flows of one piece of MBS identifier information are mapped to one or more PTM radio bearers. Different PTM radio bearers corresponding to the same MBS identifier information use different logical channel identifiers.

In an exemplary implementation, one or more of the following operations are performed for each piece of MBS identifier information: a PDCP entity is established based on the first bearer configuration and/or the second bearer configuration; an RLC entity is established based on the first bearer configuration and/or the second bearer configuration; a broadcast/multicast service logical channel corresponding to the radio bearer is configured in a media access control (MAC) entity; the association between the PDCP entity and the broadcast/multicast service logical channel is established; the broadcast/multicast service logical channel uses a default logical channel identifier; and the association between the PDCP entity and the broadcast/multicast service logical channel is established.

In an exemplary implementation, one or more of the following operations are performed for each PTM radio bearer identifier: a PDCP entity is established; an RLC entity is established; a broadcast/multicast service logical channel corresponding to the PTM radio bearer identifier is configured in the MAC entity; and the association between the PDCP entity and the broadcast/multicast service logical channel is established.

In an exemplary implementation, all QoS flows of one MBS session are mapped to one PTM radio bearer. Different PTM radio bearers corresponding to different MBS sessions use a default logical channel identifier.

In an exemplary implementation, all QoS flows of one MBS session are mapped to one or more PTM radio bearers. Different PTM radio bearers of the same MBS session use different logical channel identifiers. For each PTM radio bearer, the second bearer configuration includes a PTM radio bearer identifier and/or a logical channel identifier.

In an exemplary implementation, the SDAP entity corresponding to the MBS session is established, and the SDAP entity is configured based on the SDAP configuration of the first bearer configuration and/or the second bearer configuration.

In an exemplary implementation, in the case where the first bearer configuration and the second bearer configuration have overlapping parameters, the SDAP entity, the PDCP entity, and the RLC entity are configured separately by using the information included in the second bearer configuration.

In this embodiment, the contents in the SDAP configuration information may be partly or entirely in the first bearer configuration (default configuration) or may be partly or entirely in the second bearer configuration (acquired by the first information). When parameters overlap, related parameters are configured by using the second bearer configuration.

Figure 3:
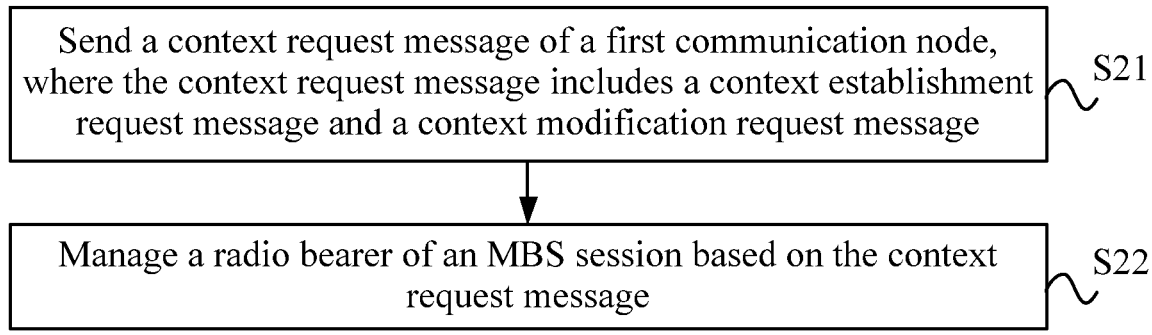
FIG. 3 is a flowchart of a context message management method according to an embodiment of the present application.

In an embodiment, the present application provides a context message management method. FIG. 3 is a flowchart of a context message management method according to an embodiment of the present application. This method may be applied to the case where bearer configuration is performed inside a base station. This method may be executed by a context message management apparatus provided by the present application. The context message management apparatus may be performed by software and/or hardware. The method is applied to a second communication node.

As shown in FIG. 3, the context message management method provided by this embodiment of the present application mainly includes S21 and S22.

In S21, a context request message of a first communication node is sent, where the context request message includes a context establishment request message and a context modification request message.

In S22, a radio bearer of an MBS session is managed based on the context request message.

In this embodiment, the second communication node may be understood as a central unit in a gNB (gNB-CU). The context request message is sent by a distribution unit in the gNB (gNB-DU) to the gNB-CU. That is, the context message management method provided by the present application is executed by the gNB-CU.

In an exemplary implementation, a list of to-be-modified radio bearers includes information of to-be-established radio bearers for the MBS session. The list of the to-be-modified radio bearers is carried by the context establishment request message or by the context modification request message.

In an exemplary implementation, the radio bearer information includes MBS session identifier information. The MBS session identifier information is associated with the radio bearer identifier and the QoS flow list mapped to the radio bearer.

In an exemplary implementation, an MBS identifier is associated with the radio bearer identifier or the QoS flow list mapped to the radio bearer.

In an exemplary implementation, each QoS flow in the QoS flow list mapped to the radio bearer includes one or more of the following: a QoS flow identifier, a QoS parameter of a QoS flow level, a QoS flow mapping indication parameter, and MBS session identifier information.

The MBS session identifier information is associated with the QoS flow identifier.

In an exemplary implementation, the QoS parameter of the QoS flow level includes MBS session identifier information which is used for indicating an MBS session to which the QoS flow belongs.

In an embodiment, the present application provides a releasing method. FIG. 4 is a flowchart of a releasing method according to an embodiment of the present application. The method may be applicable to the case where a user equipment releases a radio bearer and an SDAP. This method may be executed by a releasing apparatus provided by the present application. This releasing apparatus may be performed by software and/or hardware. The method is applied to the first communication node.

As shown in FIG. 4, the releasing method provided by this embodiment of the present application mainly includes S31 and S32.

In S31, in the case where a releasing condition is satisfied, a radio bearer associated with an MBS session is released.

In S32, an SDAP entity is released. The releasing condition includes one or more of the following conditions: the MBS session ends; and first information is received. The first information carries an identifier of a to-be-released radio bearer.

In this embodiment, the first communication node may be any user equipment described in the preceding system and is merely illustrated in this embodiment and not limited thereto.

The first information is sent by a base station to the user equipment. The base station may be any one of the base stations described in the preceding system and is merely illustrated in this embodiment and not limited thereto.

In an exemplary implementation, the radio bearer associated with the MBS session is released in the manner below.

When the MBS session ends, all PTP radio bearers associated with the MBS session or all PTM radio bearers associated with the MBS session are released.

In an exemplary implementation, the SDAP entity is released in the manner below.

When the MBS session ends, all SDAP entities associated with the MBS session are released.

In an exemplary implementation, the SDAP entity is released in the manner below.

When an upper layer instructs to release an SDAP entity associated with a PTM radio bearer for one MBS session, all SDAP entities associated with the MBS session are released.

In an exemplary implementation, the SDAP entity is released in the manner below.

In the case where a radio bearer associated with the SDAP entity is released, the SDAP entity is released.

First, one MBS session has at least one QoS flow. One piece of MBS session identifier information is used for uniquely distinguishing one MBS session. One QoS flow identifier is used for uniquely distinguishing one QoS flow in one MBS session. The MBS session identifier information includes one or more of the following: an MBS session identifier, a temporary mobile group identity (TMGI) of a multicast broadcast service, MBS identifier information, and a PDU session identifier. All QoS flows in one MBS session may come from one MBS or multiple MBSs. One piece of MBS identifier information is used for uniquely distinguishing one MBS. One piece of MBS identifier information includes one or more of the following pieces of information: one MBS session identifier, at least one QoS flow identifier list in one MBS session, one MBS identifier, one Internet Protocol (IP) multicast address, one IP source address, and one TMGI.

In the present application, the MBS session identifier information and the MBS identifier information refer to the same information and are merely different in expression.

There are two modes of communication between the base station and the UE. One is the PTP mode, and the other is the PTM mode. The PTP mode represents the point-to-point communication mode used between the UE and the base station. The bearer of the PTP mode may be a DRB, a unicast RB, a PTP radio bearer, or a PTP bearer. The PTM mode represents the point-to-multipoint communication mode used between the UE and the base station. The bearer of the PTM mode may be a multicast RB, a broadcast RB, a PTM radio bearer, or a PTM bearer. The base station may send the bearer configuration information of the PTP mode and/or the bearer configuration information of the PTM mode to the UE and then transmit MBS data to the UE through the PTP or PTM manner. The UE may correspondingly configure the bearer of the PTP mode or the bearer of the PTM mode to receive the MBS data sent by the base station. The configuration of the bearer includes establishment of the bearer, modification of the bearer, and release of the bearer.

In an embodiment, the present application provides a bearer configuration method. FIG. 5 is a flowchart of a control plane of a bearer configuration method according to an embodiment of the present application. As shown in FIG. 5, the method according to this embodiment of the present application includes several or all of the following operations: operation 510, operation 511, operation 520, and operation 530.

A triggering condition for the base station to configure (such as to establish, to modify, or to release) a bearer for an MBS may be any one of operation 510 or operation 511.

In operation 510, the base station receives an MBS session management message from a core network (for example, an access management function (AMF)). The MBS session management message may be one of the following pieces of information: an MBS session establishment request message, an MBS session start message, an MBS session update message, an MBS session modification request message, an MBS session end message, or an MBS session release message.

The MBS session establishment request message or the MBS session start message carries any combination of the following information: an MBS session identifier, one piece of MBS identifier information or an MBS identifier information list, a to-be-established QoS flow identifier list in the MBS session, a QoS parameter corresponding to the QoS flow level of each QoS flow identifier, and a UE identifier list added to the MBS session. Each UE added to the MBS session may also include the following information: a cell identifier to which the UE belongs and/or indication information indicating whether to use PTP or PTM to receive the MBS data.

The MBS session modification request message or the MBS session update message carries any combination of the following information: MBS session identifier information, one piece of MBS identifier information or an MBS identifier information list, a to-be-added or to-be-modified QoS flow identifier list in the MBS session, a QoS parameter corresponding to the QoS flow level of each QoS flow identifier, and a UE list added to the MBS session. Each UE added to the MBS session may also include the following information: a cell identifier to which each UE belongs and/or indication information indicating whether to use a PTP bearer or a PTM bearer to receive the MBS data.

The MBS session release message or the MBS session end message carries the MBS session identifier information. The base station determines to release all bearers in the MBS session.

In step 511, after receiving the MBS session management message, the base station sends an MBS session management response message to the core network. After receiving the MBS session establishment request message from the core network, the base station sends MBS session establishment response message to the core network as a reply. After receiving MBS session modification request message from the core network, the base station sends MBS session modification response message to the core network as a reply. After receiving the MBS session release message from the core network, the base station sends MBS session release response message to the core network as a reply. After receiving the MBS session start message from the core network, the base station sends MBS session start response message to the core network as a reply. After receiving the MBS session update message from the core network, the base station sends MBS session update response message to the core network as a reply. After receiving the MBS session end message from the core network, the base station sends MBS session end response message to the core network as a reply.

In step 520, the base station determines to configure a bearer for a corresponding UE based on the MBS session management message and/or resource usage in operation 510. When the base station configures the radio bearer for the MBS for the UE, it is necessary to configure the mapping relationship between the QoS flow in the MBS session and the radio bearer. The bearer may be a radio bearer of the PTP mode or may be a radio bearer of the PTM mode.

In operation 530, in an implementation, the base station may send information including the PTP bearer configuration information for receiving the MBS data to the UE. The PTP bearer configuration information may be used for instructing the UE to establish, modify, and release the PTP bearer. The UE configures the PTP radio bearer for the MBS according to the received PTP bearer configuration information and sends an RRC completion message to the base station. In another implementation, in operation 530, the base station may further send information including the PTM bearer configuration information corresponding to the MBS session to the UE. The information may be sent to the UE in a broadcast manner or a unicast manner.

Figure 6:
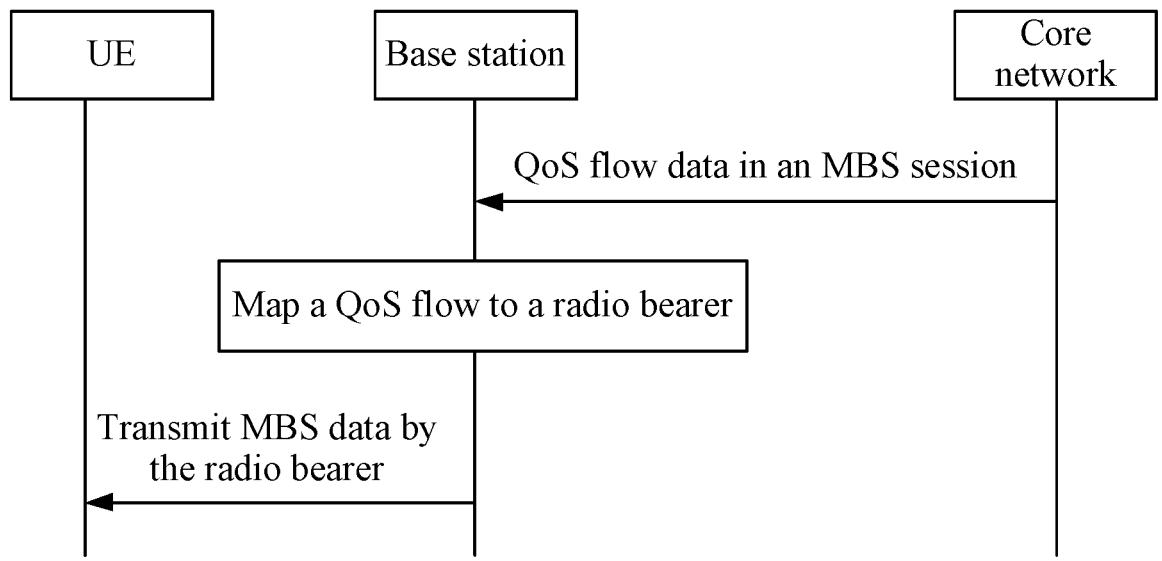
FIG. 6 is a flowchart of a user plane where a base station configures a UE with a radio bearer for an MBS.
Figure 7:
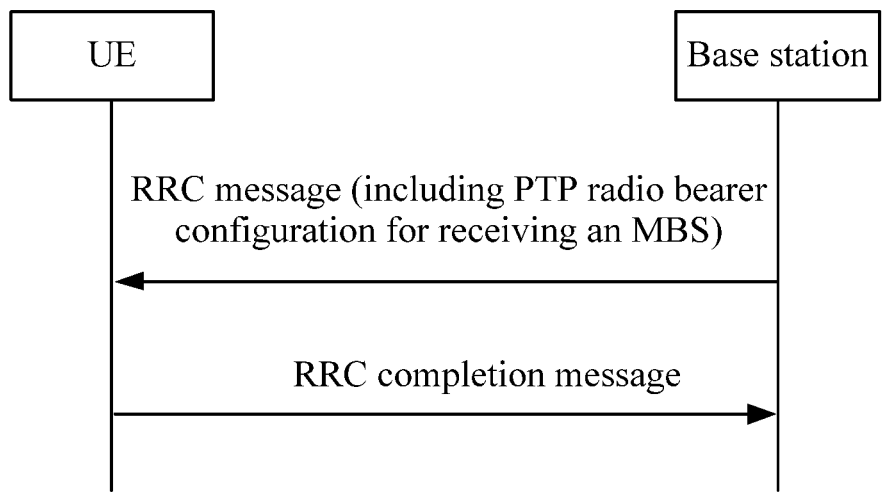
FIG. 7 is a flowchart of radio bearer establishment.

FIG. 6 is a flowchart of a user plane where a base station configures a UE with a radio bearer for an MBS. As shown in FIG. 6, the base station receives at least one QoS flow in an MBS session from a core network and maps the QoS flow to a corresponding radio bearer. The UE receives MBS data in the corresponding radio bearer from the base station.

In an applicable implementation, a method of mapping a QoS flow of one MBS session to a PTM bearer and PTP radio bearers of different UEs in the base station is provided.

The flow on the control plane on the base station side includes the following: for an MBS session, the manner in which the base station establishes a corresponding SDAP entity includes, but is not limited to, one or more of the manners below.

Manner one: For an MBS session, the base station establishes an SDAP entity for each UE using a PTP radio bearer, and the SDAP entity established for a specific UE is responsible for mapping a QoS flow of the MBS session to the PTP radio bearer of the UE.

Manner two: For an MBS session, the base station establishes an SDAP entity for all UEs using a PTM radio bearer, and the SDAP entity is responsible for mapping the QoS flow of the MBS session to the PTM radio bearer.

Manner three: For an MBS session, the base station establishes an SDAP entity, and the SDAP entity is responsible for mapping the QoS flow of the MBS session to the radio bearer. The mapping includes mapping the QoS flow of the MBS session to the PTP radio bearer and mapping the QoS flow of the MBS session to the PTM radio bearer.

The flow on the user plane on the base station side includes the following.
(1) The base station receives QoS flow data in an MBS session from the core network and delivers the received QoS flow data to each SDAP entity associated with the MBS session.
(2) Each SDAP entity of the base station maps data received from an upper layer to a corresponding radio bearer. A mapping rule is determined by the control plane.

In an embodiment, a method in which the UE establishes an SDAP entity associated with an MBS session is provided. For an MBS session, the manner in which the UE establishes the SDAP entity associated with the MBS session includes, but is not limited to, one or more of the manners below.

Manner one: For an MBS session, the UE establishes a first SDAP entity, and the first SDAP entity is responsible for mapping a QoS flow of the MBS session to the PTP radio bearer.

Manner two: For an MBS session, the UE establishes a second SDAP entity, and the second SDAP entity is responsible for mapping the QoS flow of the MBS session to the PTM radio bearer.

Manner three: For an MBS session, the UE establishes a third SDAP entity, and the third SDAP entity is responsible for mapping the QoS flow of the MBS session to the radio bearer. The mapping includes mapping the QoS flow of the MBS session to the PTP radio bearer and mapping the QoS flow of the MBS session to the PTM radio bearer.

In the following embodiment, a method in which a UE configures a PTP radio bearer for receiving an MBS is provided.

In an applicable implementation, the UE receives radio bearer configuration information sent by a base station and used for receiving the MBS. The bearer configuration information carries any combination of the following information: a radio bearer identifier (for example, an RB ID), a cast mode indication, SDAP configuration, PDCP configuration, and RLC bearer configuration. The cast mode indication includes at least one of the following: unicast, multicast, or broadcast.

In another applicable implementation, the UE receives radio bearer configuration information sent by the base station. The radio bearer configuration information includes lists of to-be-established PTP radio bearers and to-be-modified PTP radio bearers. The list includes radio bearer (that is, a DRB) information of the PTP mode for MBS data transmission. For each DRB used for the MBS data, the radio bearer configuration information further includes one or more of the following pieces of information: a radio bearer identifier (for example, a DRB ID), SDAP configuration, PDCP configuration, and RLC bearer configuration.

The SDAP configuration is associated with a radio bearer identifier. The SDAP configuration includes any combination of the following information: an indication indicating whether the radio bearer is a default radio bearer; an indication indicating whether downlink data on the radio bearer has an SDAP header; an indication indicating whether uplink data on the radio bearer has an SDAP header; session identifier information; an uplink QoS flow list, in an MBS session, that is to be mapped to the radio bearer and to be added; and a to-be-released QoS flow list, in the MBS session, that has been mapped to the radio bearer.

The session identifier information in the SDAP configuration is used for identifying an MBS session associated with the SDAP configuration, and the design and meaning of the session identifier information include the three manners below.

Manner one: The session identifier information is a PDU session identifier. The PDU session used for a unicast service and the MBS session used for the MBS are uniquely distinguished by using the PDU session identifier. The value space of the PDU session identifier may be divided into two subspaces. The value of the session identifier used for the unicast service is located in one space, and the value of the session identifier used for the MBS is located in the other subspace. For example, when the value of the PDU session identifier is 0 to X, it indicates the unicast service, and when the value is X+1 to Y, it indicates a multicast service, where Y=255, and X is any value in 0 to 254. The PDU session identifier is used for identifying that the QoS flow of which PDU session is mapped to the radio bearer associated with this SDAP configuration.

Manner two: The session identifier information is MBS session identifier information. The session used for the MBS is distinguished by using the MBS session identifier information, and the session used for the unicast service is distinguished by using the PDU session identifier. The MBS session identifier information indicates that the QoS flow of which MBS session is mapped to the radio bearer associated with this SDAP configuration.

Manner three: The session identifier information includes a PDU session identifier and MBS session identifier information. The MB S session identifier information indicates that the QoS flow of which MBS session is mapped to the radio bearer associated with this SDAP configuration. The PDU session identifier indicates which PDU session is associated with the MBS session.

The PDCP configuration is associated with a radio bearer identifier. The PDCP configuration includes any combination of the following information: cipheringDisabledkey (indicating whether the encryption algorithm is used), discardTimer (the timing of discarding the PDCP data packet), drb-ContinueROHC (whether the PDCP entity continues or resets the ROHC protocol in the case of reestablishment), headerCompression (header compression configuration), integrityProtection (whether the radio bearer is configured with integrity protection), maxCID (the maximum value of the header compression CID parameter), moreThanOneRLC (the PDCP entity being associated with more than one RLC entity in uplink data transmission), outOfOrderDelivery (allowing out-of-order), pdcp-Duplication (whether the uplink PDCP duplication is configured and activated), pdcp-SN-SizeDL (a downlink PDCP sequence number size), pdcp-SN-SizeUL (an uplink PDCP sequence number size), primaryPath (indicating a cell group ID and an LCD corresponding to a main RLC entity in the case where more than one RLC entity is associated in the uplink data transmission), statusReportRequired (whether the radio bearer is configured to transmit the PDCP status report), t-Reordering (reordering time), and ul-DataSplitThreshold (a data volume threshold when the uplink data uses a split bearer).

The RLC bearer configuration includes an LCD, a radio bearer identifier served by the RLC bearer, RLC configuration, logical channel configuration, and an identifier indicating whether to reestablish RLC. The RLC configuration indicates the RLC mode (an unacknowledged mode (UM) and an AM) used by this radio bearer and provides parameters of the corresponding RLC mode. The RLC configuration includes any combination of the following information: maxRetxThreshold (the maximum number of retransmissions), pollByte (indicating every how many bytes an AM RLC entity sending end triggers a poll), pollPDU (indicating every how many poll PDUs the AM RLC entity sending end triggers a poll), sn-FieldLength (indicating an RLC SN size), t-PollRetransmit (a timer in an RLC AM), t-Reassembly (a reassembly timer), and t-StatusProhibit (a status report timer).

In an applicable implementation, a method in which a UE establishes or modifies a radio bearer is provided. Radio bearer configuration information received by the UE includes a list of to-be-established or to-be-modified PTP radio bearer identifiers. The UE executes the bearer establishment operation or the bearer modification operation below.

For each to-be-established or to-be-modified radio bearer identifier included in the radio bearer configuration information, if the radio bearer is not part of the configuration that the UE already has, the UE should execute one or more of the operations below.

1> A PDCP entity is established and configured according to the received PDCP configuration.

2> If the bearer configuration information carries the SDAP configuration, there are several optional manners below for the operation of the UE.

Manner one: A first SDAP entity is established if the first SDAP entity corresponding to the received session identifier information does not exist.

Manner two: A third SDAP entity is established if the third SDAP entity corresponding to the received session identifier information does not exist.

3> If the SDAP entity corresponding to the session identifier information does not exist before the configuration information is received, an upper layer is informed of the establishment of the user plane resource for the MBS session. Optionally, if the MBS session identifier information includes an MBS session identifier and a PDU session identifier, the PDU session is associated with the MBS session.

4> The SDAP entity is configured according to the received SDAP configuration, and the radio bearer is associated with the SDAP entity.

For each to-be-established or to-be-modified radio bearer identifier included in the radio bearer configuration information, if the radio bearer is part of the configuration that the UE already has, the UE should execute one or more of the operations below.

1> If the bearer configuration carries a PDCP reestablishment indication, the PDCP entity is reestablished according to the PDCP configuration.

2> If the bearer configuration carries a PDCP recovery indication, the PDCP entity of the radio bearer is triggered so that a PDCP data recovery process is performed.

3> If the bearer configuration carries the PDCP configuration, the PDCP entity of this radio bearer is reconfigured according to the PDCP configuration.

4> If the bearer configuration carries the SDAP configuration, the SDAP entity is reconfigured according to the received SDAP configuration.

5> For the uplink QoS flow list, in the MBS session, that is to be mapped to the radio bearer and to be added, if the QoS flow therein is previously configured, the QoS flow needs to be released from the original radio bearer.

In an applicable implementation, a method in which a UE releases a radio bearer is provided.

In the releasing flow of the radio bearer, the UE executes one or more of the operations below.

If radio bearer configuration information received by the UE includes a list of to-be-released PTP radio bearer identifiers, the UE should execute the following radio bearer releasing operations: for each to-be-released radio bearer identifier, the UE should release a PDCP entity and the radio bearer identifier; if an SDAP entity associated with this radio bearer has been configured, the SDAP entity associated with this radio bearer is informed of the release of this radio bearer; and when an MBS session ends, the UE should release all radio bearers associated with this MBS session.

In an applicable implementation, a method for releasing an SDAP entity is provided. The operations related to releasing the SDAP entity include one or more of the operations below.

When RRC requests to release the SDAP entity, the UE should release the SDAP entity. When the RRC indicates that a radio bearer is released, the SDAP entity should remove all QoS flows mapped to this released radio bearer.

The UE may know the end time of an MBS session according to context information of the MBS session. When the MBS session ends, the UE should release the SDAP entity associated with the MBS session.

In the following embodiment, a method in which a base station informs a UE of PTM bearer configuration information for receiving an MBS is provided.

Before the UE configures a PTM radio bearer for receiving MBS data, the UE needs to acquire any combination of the following configuration information: MBS session identifier information, a radio network temporary identifier for a broadcast/multicast service, scheduling information of a multicast service channel, a physical layer parameter required for configuring the multicast service channel, and PTM bearer configuration. Each PTM bearer configuration includes any combination of the following information: a PTM radio bearer identifier, SDAP configuration, PDCP configuration, and RLC bearer configuration. The RLC bearer configuration includes any combination of the following information: RLC configuration, a logical channel identifier, and logical channel configuration.

For the PTM bearer configuration, all information of the PTM bearer configuration may be acquired in two manners. In one manner, the UE adopts default configuration. In the present disclosure, the related information acquired through the default configuration is referred to as first bearer configuration. In the other manner, the base station sends the information to the UE. In the present disclosure, the partial information acquired in this manner is referred to as second bearer configuration. The first bearer configuration includes part, none, or all of the PTM bearer configuration. The second bearer configuration includes part, none, or all of the PTM radio bearer information. In an implementation, the information included in the second bearer configuration is different from the information included in the PTM bearer configuration. In another implementation, the information included in the second bearer configuration may also overlap with the information included in the first bearer configuration, that is, the second bearer configuration has the same parameter as the first bearer configuration.

In an embodiment, a base station sends first information that indicates a list of ongoing MBS sessions/services in a cell and scheduling information of the corresponding session/service. For each MBS session, the first information includes one or more of the following pieces of information: MBS session identifier information, a radio network temporary identifier for a broadcast/multicast service, scheduling information of a multicast service channel, and a physical layer parameter required for configuring the multicast service channel.

In an applicable implementation, all QoS flows of one MBS session are mapped to one PTM radio bearer. Different PTM radio bearers corresponding to different MBS sessions use the same logical channel identifier. In an implementation, first bearer configuration includes a default logical channel identifier and/or a radio bearer identifier. A MAC entity distinguishes PTM bearers of different MBS sessions through the radio network temporary identifier for the broadcast/multicast service. The PTM bearer configuration uses only default configuration. For each MBS session identifier information in the received first information, the flow in which the UE establishes a corresponding PTM radio bearer includes one or more of the operations below.

1> A PDCP entity is established according to the first bearer configuration.
2> An RLC entity is established according to the first bearer configuration.
3> A broadcast/multicast service logical channel corresponding to the radio bearer is configured. A MAC is informed to receive a downlink shared channel in a cell where the received first information is located. The MAC receives the corresponding MBS by using the radio network temporary identifier for the broadcast/multicast service in the first information and the scheduling information of the multicast service channel in the first information.
4> An association between the logical channel and the PDCP entity corresponding to the radio bearer identifier or the MBS session identifier information is established.
5> A physical layer parameter is configured according to the information in the first information.
6> An upper layer is informed of the establishment of the PTM radio bearer in the three manners below.

Manner one: The upper layer is informed of the establishment of the PTM radio bearer through the corresponding MBS session identifier information.

Manner two: A second SDAP entity is established for the MBS session. The second SDAP entity is configured to map a QoS flow in the MBS session to the PTM radio bearer, enables the SDAP entity to associate with the radio bearer, and informs the upper layer of the establishment of the user plane resource for the MBS session.

Manner three: If a third SDAP entity corresponding to the MBS session does not exist, the third SDAP entity is established for the MBS session. The third SDAP entity is configured to map the QoS flow in the MBS session to the PTM radio bearer and map the QoS flow in the MBS session and the PTP radio bearer, enables the SDAP entity to associate with the radio bearer, and informs the upper layer of the establishment of the user plane resource for the MBS session.

In an applicable implementation, a method for releasing a PTM radio bearer is provided.

When the PTM radio bearer is released, a UE should execute one or more of the operations below.

An RLC entity, the related MAC, and physical layer configuration are released. The PDCP entity is released. The upper layer is informed of the release of the PTM radio bearer through corresponding MBS session identifier information. The SDAP entity associated with this radio bearer is released.

In an applicable implementation, a method for releasing an SDAP entity is provided.

When a PTM radio bearer is released, the SDAP entity should release an SDAP entity associated with the PTM radio bearer when RRC (an RRC entity in a UE) indicates that a PTM radio bearer is released.

In an embodiment, the first information includes one or more of the following pieces of information: MBS session identifier information, a radio network temporary identifier for a broadcast/multicast service, scheduling information of a multicast service channel, a physical layer parameter required for configuring the multicast service channel, and second bearer configuration. All QoS flows of one MBS session are mapped to one PTM radio bearer. Different PTM radio bearers corresponding to different MBS sessions use the same logical channel identifier.

In an implementation, first bearer configuration includes a default logical channel identifier and/or a radio bearer identifier.

In another implementation, the second bearer configuration may include any radio bearer identifier and/or logical channel identifier. A MAC entity distinguishes PTM bearers of different MBS sessions through the radio network temporary identifier for the broadcast/multicast service.

For each MBS session identifier information in the received first information, the flow in which the UE establishes a corresponding PTM radio bearer includes one or more of the operations below.

1> For each MBS session identifier, if there is no PTM radio bearer associated with this MBS session identifier in the configuration that the UE already has, a receiving end should perform the following operations.

2> A PDCP entity is established and configured according to the first bearer configuration and/or the second bearer configuration.

3> An RLC entity is established and configured according to the first bearer configuration and/or the second bearer configuration.

4> A broadcast/multicast service logical channel corresponding to the radio bearer is configured, the MAC is informed to receive the downlink shared channel in the cell where the received first information is located, and the corresponding MBS is received by using the radio network temporary identifier for the broadcast/multicast service in the first information and the scheduling information of the multicast service channel in the first information.

5> The association between the logical channel and the PDCP entity corresponding to the radio bearer identifier or the MBS session identifier information is established.

6> The physical layer parameter is configured according to the related information in the first information.

7> The upper layer is informed of the establishment of the PTM radio bearer in the three manners below.

Manner one: The upper layer is informed of the establishment of the PTM radio bearer through the corresponding MBS session identifier information.

Manner two: If the second SDAP entity corresponding to the received MBS session identifier information does not exist, where the second SDAP entity is configured to map the QoS flow in the MBS session to the PTM radio bearer, a second SDAP entity is established. If the SDAP entity corresponding to the MBS session identifier information does not exist before the configuration information is received, the upper layer is informed of the establishment of the user plane resource for the MBS session. The second SDAP entity is configured according to the first bearer configuration and/or the second bearer configuration. The SDAP entity is associated with the PTM radio bearer. The upper layer is informed of the establishment of the user plane resource for the MBS session.

Manner three: If the third SDAP entity corresponding to the received MBS session identifier information does not exist, where the third SDAP entity is configured to map the QoS flow in the MBS session to the PTM radio bearer and map the QoS flow in the MBS session to the PTP radio bearer, a third SDAP entity is established. If the SDAP entity corresponding to the MBS session identifier information does not exist before the configuration information is received, the upper layer is informed of the establishment of the user plane resource for the MBS session. The third SDAP entity is configured according to the first bearer configuration and/or the second bearer configuration. The SDAP entity is associated with the PTM radio bearer. The upper layer is informed of the establishment of the user plane resource for the MBS session.

8> In the present application, configuration is performed according to the first bearer configuration and/or the second bearer configuration in the several manners below.

Manner one: Corresponding parameters of the RLC entity, the PDCP entity, or the SDAP entity are configured by using the first bearer configuration.

Manner two: Corresponding parameters of the RLC entity, the PDCP entity, or the SDAP entity are configured by using the second bearer configuration.

Manner three: If the received second bearer configuration and the first bearer configuration have overlapping or identical parameters, it is preferable to configure the partial parameters by using the information included in the received second bearer configuration.

In an applicable implementation, for each MBS session identifier, if there is a PTM radio bearer associated with this MBS session identifier in the configuration that the UE already has, the receiving end should perform the following operations: if the received first information includes the second bearer configuration, and if the second bearer configuration carries the PDCP reestablishment indication, reestablishing the PDCP entity according to the PDCP configuration included in the first bearer configuration and/or the PDCP configuration included in the second bearer configuration; if the second bearer configuration carries the PDCP configuration, reconfiguring the PDCP entity of the radio bearer according to the PDCP configuration included in the second bearer configuration; if the second bearer configuration carries an RLC reestablishment indication, reestablishing the RLC entity according to the RLC configuration included in the first bearer configuration and/or the RLC configuration included in the second bearer configuration; if the second bearer configuration carries the RLC configuration, reconfiguring the RLC entity of the radio bearer according to the RLC configuration included in the second bearer configuration; and if the second bearer configuration carries the SDAP configuration, reconfiguring the SDAP entity according to the SDAP configuration included in the second bearer configuration.

In an embodiment, the first information includes one or more of the following pieces of information: MBS session identifier information, a radio network temporary identifier for a broadcast/multicast service, scheduling information of a multicast service channel, a physical layer parameter required for configuring the multicast service channel, and second bearer configuration. All QoS flows of one MBS session are mapped to one or more PTM radio bearers. Different PTM radio bearers in one MBS session use different logical channel identifiers. For each PTM bearer, the second bearer configuration includes any combination of the following information: a PTM radio bearer identifier, SDAP configuration, PDCP configuration, RLC bearer configuration, a PTM radio bearer identifier, and a logical channel identifier. In an implementation, the value space of the logical channel identifier used by the PTM bearer and the value space of the logical channel identifier used by the PTP bearer do not intersect each other. The MAC entity distinguishes the different radio bearers through a logical channel identifier. In another implementation, the MAC entity distinguishes different radio bearers of different MBS sessions through the radio network temporary identifier (for example, a Global System for Mobile Communications (GSM)-radio network temporary identifier (G-RNTI)) for the broadcast/multicast service and a logical channel identifier.

The configuration information in the second bearer configuration is the same as the information of the second bearer configuration provided in the preceding embodiments. Reference may be made to the description in other embodiments, and details are not repeated in this embodiment.

The flow in which the UE establishes the PTM radio bearer is below.

For each PTM radio bearer identifier in the second bearer configuration, if the radio bearer is not part of the configuration that the UE already has, the UE should perform one or more of the operations below.

1> A PDCP entity is established and configured according to the first bearer configuration and/or the second bearer configuration.

2> An RLC entity is established and configured according to the first bearer configuration and/or the second bearer configuration.

3> A broadcast/multicast service logical channel corresponding to the radio bearer is configured according to the received logical channel configuration information. The MAC entity is informed to receive the downlink shared channel in the cell where the received first information is located. The corresponding MBS is received by using the radio network temporary identifier for the broadcast/multicast service in the first information and the scheduling information of the multicast service channel in the first information.

4> The logical channel is associated with the PDCP entity corresponding to the PTM radio bearer identifier.

5> The physical layer parameter is configured according to the information in the first information.

6> The upper layer is informed of the establishment of the PTM radio bearer in the several manners below.

Manner one: The upper layer is informed of the establishment of the PTM radio bearer through the corresponding MBS session identifier information.

Manner two: If the second SDAP entity corresponding to the received MBS session identifier information does not exist, where the second SDAP entity is configured to map the QoS flow in the MBS session to the PTM radio bearer, the second SDAP entity is established. If the SDAP entity corresponding to the MBS session identifier information does not exist before the configuration information is received, the upper layer is informed of the establishment of the user plane resource for the MBS session. The second SDAP entity is configured according to the first bearer configuration and/or the second bearer configuration. The SDAP entity is associated with the PTM radio bearer. The upper layer is informed of the establishment of the user plane resource for the MBS session.

Manner three: If the second SDAP entity corresponding to the received MBS session identifier information does not exist, where the second SDAP entity is configured to map the QoS flow in the MBS session to the PTM radio bearer, the second SDAP entity is established. If the SDAP entity corresponding to the MBS session identifier information does not exist before the configuration information is received, the upper layer is informed of the establishment of the user plane resource for the MBS session. The second SDAP entity is configured according to the first bearer configuration and/or the second bearer configuration. The SDAP entity is associated with the PTM radio bearer. The upper layer is informed of the establishment of the user plane resource for the MBS session.

In an embodiment, a method for releasing a PTM radio bearer is provided. A UE receives first information from a base station. The first information carries an identifier list of to-be-released PTM radio bearers or an MBS session identifier information list corresponding to the to-be-released PTM radio bearers.

In an applicable implementation, for each to-be-released PTM radio bearer identifier, the UE should execute one or more of the operations below.

A PDCP entity and a PTM radio bearer identifier are released. If an SDAP entity associated with this radio bearer has been configured, an SDAP entity associated with this PTM radio bearer is informed of the release of this radio bearer.

In an applicable implementation, for each to-be-released MBS session identifier information, the UE should execute one or more of the operations below.

All PTM radio bearers associated with this MBS session are released. One or more of the following associated with this MBS session are released: a radio resource, a first SDAP entity, a second SDAP entity, a third SDAP entity, a PDCP entity, an RLC entity, a PTP radio bearer identifier, a PTP radio bearer, a PTM radio bearer identifier, and a PTM radio bearer.

In an applicable implementation, a releasing method includes one or more of the operations below.

When RRC (for example, an RRC entity in a UE) requests to release an SDAP entity, the UE should release the SDAP entity. When the RRC (for example, the RRC entity in the UE) indicates that a PTM radio bearer is released, the SDAP entity should remove all QoS flows mapped to this released PTM radio bearer. When the MBS session ends, one or more of the following associated with this MBS session are released: a radio resource, a first SDAP entity, a second SDAP entity, a third SDAP entity, a PDCP entity, an RLC entity, a PTP radio bearer identifier, a PTP radio bearer, a PTM radio bearer identifier, and a PTM radio bearer.

Figure 8:
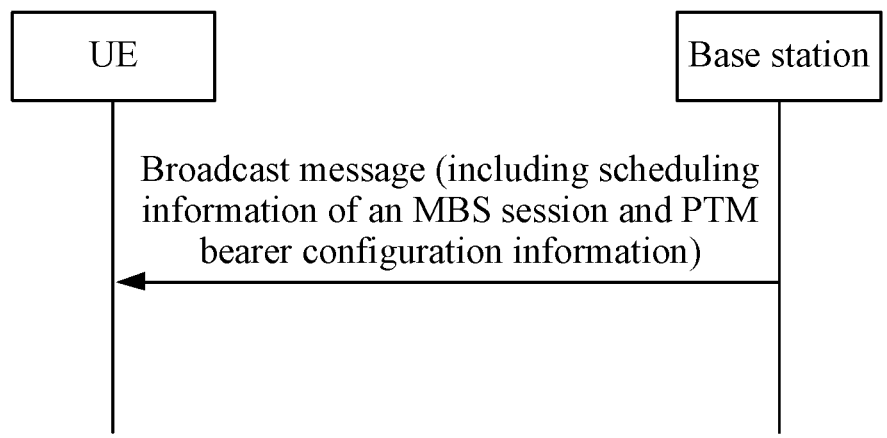
FIG. 8 is a flowchart of the acquisition of a broadcast message.

In an applicable implementation, FIG. 8 is a flowchart of the acquisition of a broadcast message. As shown in FIG. 8, a base station sends a broadcast message to the UE. The broadcast message carries first information.

Figure 9:
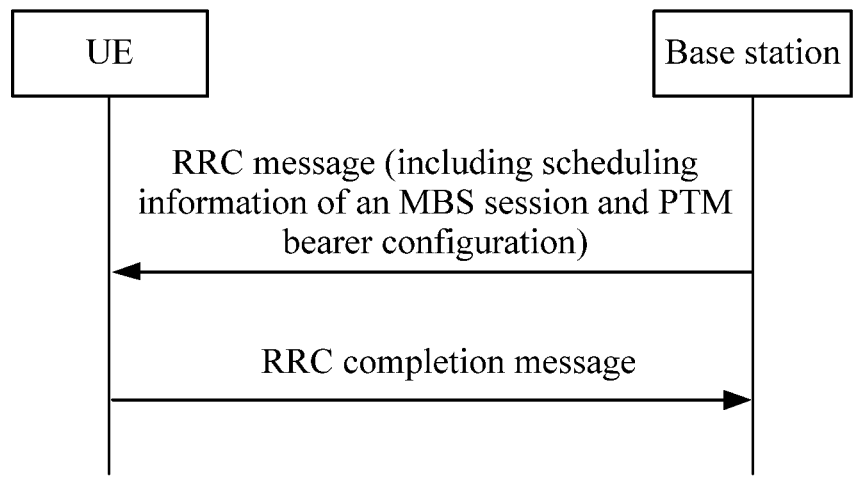
FIG. 9 is a flowchart of the interaction between a base station and a terminal.

In an applicable implementation, FIG. 9 is a flowchart of the interaction between a base station and a terminal. As shown in FIG. 9, the base station sends RRC information to the UE. The RRC information carries first information.

In the preceding two embodiments, two methods in which the base station sends the first information to the UE are provided. The methods in which the base station sends the first information to the UE are merely illustrated in this embodiment and not limited thereto. In practical applications, either of the preceding two methods may be selected.

In the present application, only the methods in which the base station sends the first information to the UE are different. After the UE receives the first information, the method for configuring the radio bearer is the same. Reference may be made to the description in other embodiments in the present application, and details are not repeated in this embodiment.

The following embodiment provides a scheme in which an F1 interface inside a base station (gNB-CU and gNB-DU) manages a PTP radio bearer corresponding to an MBS.

In an applicable implementation, context of a PTP RB is interacted by a UE-associated F1 Application Protocol (F1AP) signaling.

The gNB-CU maintains MBS session context (including MBS session identifier information, a UE list added to the MBS session, and a QoS parameter of the QoS flow level) and UE context (including a PTP radio bearer list of the UE) of each UE.

The gNB-DU maintains UE context (including the PTP radio bearer list of the UE) for each UE in an RRC connected state and MBS session context (including the PTM radio bearer list of the session). The PTP radio bearer is managed by the UE context. The PTP radio bearer is associated with the MBS session corresponding to the radio bearer.

The interaction of the PTP radio bearer on F1 is placed in each UE context. The establishment, modification, and release of the F1 interface with respect to the UE context need to include an information element (IE) for the PTP radio bearer. The configuration of the PTP radio bearer in a DRB to be setup list in the F1AP signaling includes the MBS session identifier information (MBS session ID/TMGI).

Figure 10:
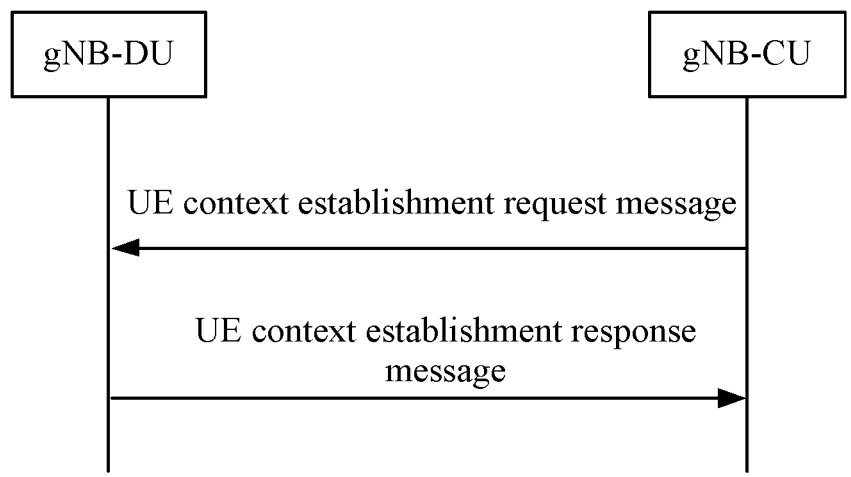
FIG. 10 is a flowchart illustrating that a next-generation NodeB-Central Unit (gNB-CU) sends a UE context establishment request message to a gNB Distribution Unit (DU).

FIG. 10 is a flowchart illustrating that a gNB-CU sends a UE context establishment request message to a gNB-DU. As shown in FIG. 10, the gNB-CU sends the UE context establishment request message to the gNB-DU, and the gNB-DU sends a UE context establishment response message to the gNB-CU.

The UE context establishment request message includes a list of to-be-established radio bearers, tunnel information corresponding to the radio bearer, and other UE context information. The list of the to-be-established radio bearers includes information of to-be-established PTP radio bearers for the MBS. The PTP radio bearer information for the MBS includes any of the following: a radio bearer identifier, radio bearer QoS information, a network slice identifier (single network slice selection assistance information (S-NSSAI)), notification control, or a QoS flow list mapped to the radio bearer.

The PTP radio bearer information for the MBS includes the MBS session identifier information. The MBS session identifier information is associated with the radio bearer identifier and the QoS flow list mapped to the radio bearer, and it indicates that the QoS flow of which session is mapped to this PTP radio bearer.

Each QoS flow in the QoS flow list mapped to the radio bearer includes any combination of the following information: indicating the QoS flow identifier mapped to this radio bearer, a QoS parameter of a QoS flow level, an indication indicating that an uplink or downlink QoS flow is mapped to this radio bearer, and MB S session identifier information. The MB S session identifier information is associated with the QoS flow identifier, and it indicates that the QoS flow corresponding to the QoS flow identifier of which MBS session is mapped to this radio bearer.

The QoS parameter of the QoS flow level may include the MBS session identifier information indicating that the related QoS flow belongs to which MBS session.

Figure 11:
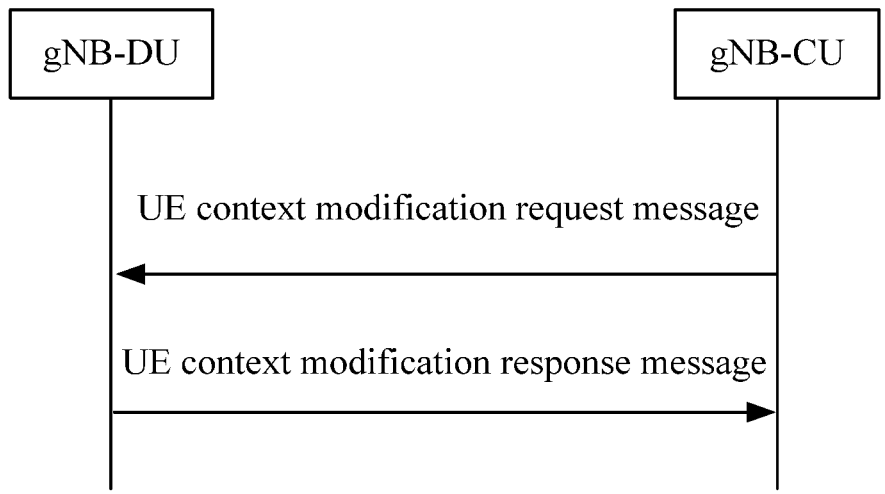
FIG. 11 is a flowchart illustrating that a gNB-CU sends a UE context modification request message to a gNB-DU.

FIG. 11 is a flowchart illustrating that a gNB-CU sends a UE context modification request message to a gNB-DU. As shown in FIG. 11, the gNB-CU sends the UE context modification request message to the gNB-DU, and the gNB-DU sends a UE context modification response message to the gNB-CU.

The UE context modification request message includes a list of to-be-established radio bearers, tunnel information corresponding to the radio bearer, a list of to-be-modified radio bearers, and other UE context information.

The list of the to-be-established radio bearers includes information of to-be-established PTP radio bearer for an MBS. For each to-be-established radio bearer, the PTP radio bearer information for the MBS includes any of the following: a radio bearer identifier, radio bearer QoS information, S-NSSAI, notification control, or a QoS flow list mapped to the radio bearer.

The PTP radio bearer information for the MBS includes the MBS session identifier information. The MBS session identifier information is associated with the radio bearer identifier and the QoS flow list mapped to the radio bearer, and it indicates that the QoS flow of which session is mapped to this PTP radio bearer.

Each QoS flow in the QoS flow list mapped to the radio bearer includes any combination of the following information: indicating the QoS flow identifier mapped to this radio bearer, a QoS parameter of a QoS flow level, an indication indicating that the uplink or downlink QoS flow is mapped to this radio bearer, and MBS session identifier information. The MBS session identifier information is associated with the QoS flow identifier, and it indicates that the QoS flow corresponding to the QoS flow identifier of which MBS session is mapped to this radio bearer.

The QoS parameter of the QoS flow level may include the MBS session identifier information indicating that the related QoS flow belongs to which MBS session.

The list of the to-be-modified radio bearers includes information of to-be-modified PTP radio bearers for the MBS. For each to-be-modified radio bearer, the PTP radio bearer information for the MBS includes any of the following: a radio bearer identifier, radio bearer QoS information, S-NSSAI, notification control, or a QoS flow list mapped to the radio bearer. Each QoS flow information in the QoS flow list mapped to the radio bearer includes any combination of the following information: indicating the QoS flow identifier mapped to this radio bearer, a QoS parameter of a QoS flow level, and an indication indicating that the uplink or downlink QoS flow is mapped to this radio bearer.

The PTP radio bearer information for the MBS includes the MBS session identifier information. The MBS session identifier information is associated with the radio bearer identifier and the QoS flow list mapped to the radio bearer, and it indicates that the QoS flow of which session is mapped to this PTP radio bearer.

Each QoS flow information in the QoS flow list mapped to the radio bearer includes the MBS session identifier information. The MBS session identifier information is associated with the QoS flow identifier, and it indicates that the QoS flow corresponding to the QoS flow identifier of which MBS session is mapped to this radio bearer.

The QoS parameter of the QoS flow level may include the MBS session identifier information indicating that the related QoS flow belongs to which MBS session.

Figure 12:
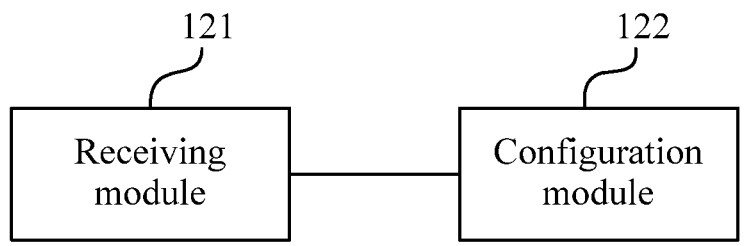
FIG. 12 is a diagram illustrating the structure of a bearer configuration apparatus according to an embodiment of the present application.

In an embodiment, the present application provides a bearer configuration apparatus. FIG. 12 is a diagram illustrating the structure of a bearer configuration apparatus according to an embodiment of the present application. The apparatus may be applicable to the case where the user establishes and modifies the radio bearer. This bearer configuration apparatus may be performed by software and/or hardware. The apparatus is configured at a first communication node.

As shown in FIG. 12, the bearer configuration apparatus provided by this embodiment of the present application includes a receiving module 121 and a configuration module 122.

The receiving module 121 is configured to receive first information.

The configuration module 122 is configured to configure a radio bearer of a multicast broadcast service (MBS) based on the first information. The radio bearer includes a point-to-point (PTP) bearer and/or a point-to-multipoint (PTM) bearer. The configuration includes one or more of the following: establishment, modification, and release.

In an exemplary implementation, the first information includes PTP bearer configuration information. The PTP bearer is configured based on the PTP bearer configuration information. The PTP bearer configuration information includes one or more of the following pieces of information: a PTP radio bearer identifier, Service Data Adaptation Protocol (SDAP) configuration information, Packet Data Convergence Protocol (PDCP) configuration information, and RLC bearer configuration information.

In an exemplary implementation, the first information includes second information. The PTM bearer is configured based on the second information. The second information includes one or more of the following: an identifier information list of ongoing MBSs, MBS identifier information, scheduling information corresponding to each piece of MBS identifier information, a radio network temporary identifier for a broadcast/multicast service, scheduling information of a multicast service channel, a physical layer parameter required for configuring the multicast service channel, and second bearer configuration.

The second bearer configuration includes one or more of the following: a PTM radio bearer identifier, a logical channel identifier, SDAP configuration information, PDCP configuration information, and RLC bearer configuration information.

In an exemplary implementation, the PTM bearer configuration information required for configuring the PTM bearer includes one or more of the following: first bearer configuration and second bearer configuration. The first bearer configuration uses default configuration. The first bearer configuration includes one or more of the following: a PTM radio bearer identifier, a logical channel identifier, SDAP configuration information, PDCP configuration information, and RLC bearer configuration information.

In an exemplary implementation, the SDAP configuration information includes one or more of the following: an indication indicating whether the radio bearer is a default radio bearer; an indication indicating whether downlink data on the radio bearer has an SDAP header; an indication indicating whether uplink data on the radio bearer has an SDAP header; MBS identifier information; an uplink QoS flow list, in an MBS session, that is mapped to the radio bearer and to be added; and a to-be-released QoS flow list, in an MBS session, that has been mapped to the radio bearer.

In an exemplary implementation, the MBS identifier information includes one or more of the following: an MBS session identifier, a temporary mobile group identity (TMGI) of the multicast broadcast service, a multicast broadcast service identifier, and a PDU session identifier indicating the MBS session.

In an exemplary implementation, in the case where the PTP bearer configuration information carries the SDAP configuration information, one or more of the operations below are performed.

A first SDAP entity is established. The first SDAP entity is configured based on the carried SDAP configuration information. An association between the first SDAP entity and a radio bearer corresponding to the PTP radio bearer identifier is established. The first SDAP entity is used for mapping a QoS flow in the MBS identifier information to a PTP radio bearer.

In an exemplary implementation, in the case where the PTM bearer configuration information includes the SDAP configuration information, one or more of the operations below are performed.

A second SDAP entity is established. The second SDAP entity is configured based on the SDAP configuration information of the first bearer configuration and/or the second bearer configuration. An association between the second SDAP entity and the radio bearer corresponding to the PTP radio bearer identifier is established. The second SDAP entity is configured to map the QoS flow in the MBS identifier information to the PTM radio bearer.

In an exemplary implementation, in the case where the PTP bearer configuration information includes the SDAP configuration information, or the PTM bearer configuration information includes the SDAP configuration information, one or more of the operations below are performed.

A third SDAP entity is established. The third SDAP entity is configured based on the SDAP configuration information. An association between the third SDAP entity and the radio bearer corresponding to the PTP radio bearer identifier or the radio bearer corresponding to the PTM radio bearer identifier is established. The third SDAP entity is configured to map the QoS flow in the MBS identifier information to the PTP radio bearer or the PTM radio bearer.

In an exemplary implementation, the PDCP configuration information includes one or more of the following: indicating whether an encryption algorithm is used, timing of discarding a PDCP data packet, whether a PDCP entity continues or resets an ROHC protocol in the case of reestablishment, header compression configuration, whether the radio bearer is configured with integrity protection, the maximum value of a header compression CID parameter, a PDCP entity being associated with more than one RLC entity in uplink data transmission, allowing out-of-order, whether uplink PDCP duplication is configured and activated, a downlink PDCP sequence number size, an uplink PDCP sequence number size, indicating a cell group ID and an LCD corresponding to a main RLC entity in the case where more than one RLC entity is associated in the uplink data transmission, whether the radio bearer is configured to transmit a PDCP status report, reordering time, and a data volume threshold when the uplink data uses a split bearer.

In an exemplary implementation, the RLC bearer configuration information includes one or more of the following: a logical channel identifier, a radio bearer identifier served by an RLC bearer, RLC configuration, logical channel configuration, an identifier indicating whether to reestablish RLC, the maximum number of retransmissions, the number of poll bytes, a poll PDU, an SN-field length, a timer in an RLC AM, a reassembly timer, and a status report timer.

In an exemplary implementation, all QoS flows of one MBS identifier information are mapped to one PTM radio bearer. Different PTM radio bearers corresponding to different MBS identifier information use the same logical channel identifier.

In an exemplary implementation, all QoS flows of one MBS identifier information are mapped to one or more PTM radio bearers. Different PTM radio bearers corresponding to the same MBS identifier information use different logical channel identifiers.

In an exemplary implementation, one or more of the operations below are performed for each MBS identifier information.

A PDCP entity is established based on the first bearer configuration and/or the second bearer configuration. An RLC entity is established based on the first bearer configuration and/or the second bearer configuration. A broadcast/multicast service logical channel corresponding to the radio bearer is configured in a MAC entity. An association between the PDCP entity and the broadcast/multicast service logical channel is established. The broadcast/multicast service logical channel uses a default logical channel identifier. The association between the PDCP entity and the broadcast/multicast service logical channel is established.

In an exemplary implementation, a PDCP entity is established for each PTM radio bearer identifier. An RLC entity is established. A broadcast/multicast service logical channel corresponding to the PTM radio bearer identifier is configured in the MAC entity. The association between the PDCP entity and the broadcast/multicast service logical channel is established.

The bearer configuration apparatus provided by this embodiment may execute the bearer configuration method provided by any embodiment of the present application and has functional modules and beneficial effects corresponding to the method executed. For technical details not described in detail in this embodiment, reference may be made to the bearer configuration method according to any embodiment of the present application.

Units and modules included in the embodiment of the bearer configuration apparatus are just divided according to functional logic, and the division is not limited to this, as long as the corresponding functions can be achieved. In addition, the names of each functional unit are just intended for distinguishing and are not to limit the protection scope of the embodiments of the present application.

Figure 13:
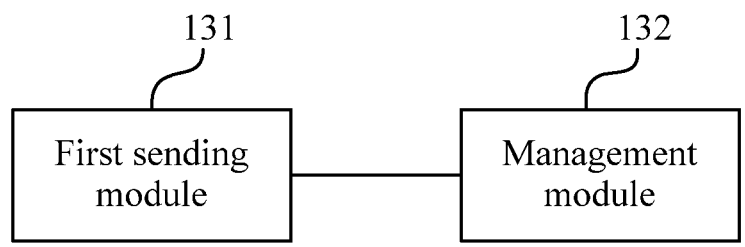
FIG. 13 is a diagram illustrating the structure of a context information message apparatus according to an embodiment of the present application.

In an embodiment, the present application provides a context message management apparatus. FIG. 13 is a diagram illustrating the structure of a context message management apparatus according to an embodiment of the present application. This apparatus may be applied to the case where bearer configuration information is performed inside a base station. The context message management apparatus may be performed by software and/or hardware. The apparatus is configured at a second communication node.

As shown in FIG. 13, the context message management apparatus provided by this embodiment of the present application includes a first sending module 131 and a management module 132.

The first sending module 131 is configured to send a context request message of a first communication node. The context request message includes a context establishment request message and a context modification request message. The management module 132 is configured to manage a radio bearer of an MBS session based on the context request message.

In an exemplary implementation, a list of to-be-modified radio bearers includes information of to-be-established radio bearers for an MBS session. The list of the to-be-modified radio bearers is carried by the context establishment request message or by the context modification request message.

In an exemplary implementation, the radio bearer information includes MBS session identifier information. The MBS session identifier information is associated with a radio bearer identifier and a QoS flow list mapped to the radio bearer.

In an exemplary implementation, the MBS identifier is associated with the radio bearer identifier or the QoS flow list mapped to the radio bearer.

In an exemplary implementation, each QoS flow in the QoS flow list mapped to the radio bearer includes one or more of the following: a QoS flow identifier, a QoS parameter of a QoS flow level, a QoS flow mapping indication parameter, and MBS session identifier information.

The MBS session identifier information is associated with the QoS flow identifier.

In an exemplary implementation, the QoS parameter of the QoS flow level includes MBS session identifier information used for indicating an MBS session to which the QoS flow belongs.

The context information message apparatus provided by this embodiment may execute the context message management method provided by any embodiment of the present application and has functional modules and beneficial effects corresponding to the method executed. For technical details not described in detail in this embodiment, reference may be made to the context information management method according to any embodiment of the present application.

Units and modules included in the embodiment of the context message management apparatus are just divided according to functional logic, and the division is not limited to this, as long as the corresponding functions can be achieved. In addition, the names of each functional unit are just intended for distinguishing and are not to limit the protection scope of the embodiments of the present application.

Figure 14:
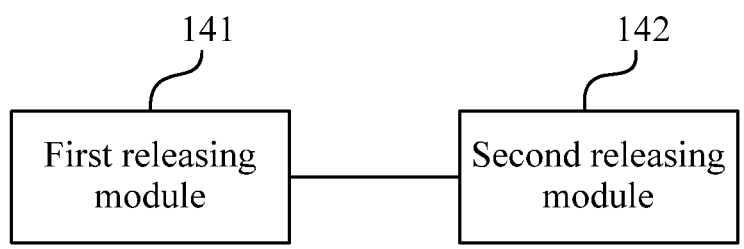
FIG. 14 is a diagram illustrating the structure of a releasing apparatus according to an embodiment of the present application.

In an embodiment, the present application provides a releasing apparatus. FIG. 14 is a diagram illustrating the structure of a releasing apparatus according to an embodiment of the present application. The apparatus may be applicable to the case where a user equipment releases a radio bearer and SDAP. This releasing apparatus may be performed by software and/or hardware. The apparatus is configured at a first communication node.

As shown in FIG. 14, the releasing apparatus provided by this embodiment of the present application includes a first releasing module 141 and a second releasing module 142.

The first releasing module 141 is configured to, in the case where a releasing condition is satisfied, release a radio bearer associated with an MBS session. The second releasing module 142 is configured to release an SDAP entity. The releasing condition includes one or more of the following conditions: the MBS session ends; and first information is received. The first information carries an identifier of a to-be-released radio bearer.

In an exemplary implementation, the first releasing module 141 is configured to release all PTP radio bearers associated with the MBS session or all PTM radio bearers associated with the MBS session when the MBS session ends.

In an exemplary implementation, the second releasing module 142 is configured to release all SDAP entities associated with the MBS session when the MBS session ends.

In an exemplary implementation, the second releasing module 142 is configured to release all SDAP entities associated with the MBS session in the case where an upper layer instructs to release an SDAP entity associated with a PTM radio bearer of one MBS session.

In an exemplary implementation, the second releasing module 142 is configured to release the SDAP entity in the case where the radio bearer associated with the SDAP entity is released.

The releasing apparatus provided by this embodiment may execute the releasing method provided by any embodiment of the present application and has functional modules and beneficial effects corresponding to the method executed. For technical details not described in detail in this embodiment, reference may be made to the releasing method according to any embodiment of the present application.

Units and modules included in the embodiment of the releasing apparatus are just divided according to functional logic, and the division is not limited to this, as long as the corresponding functions can be achieved. In addition, the names of each functional unit are just intended for distinguishing and are not to limit the protection scope of the embodiments of the present application.

Figure 15:
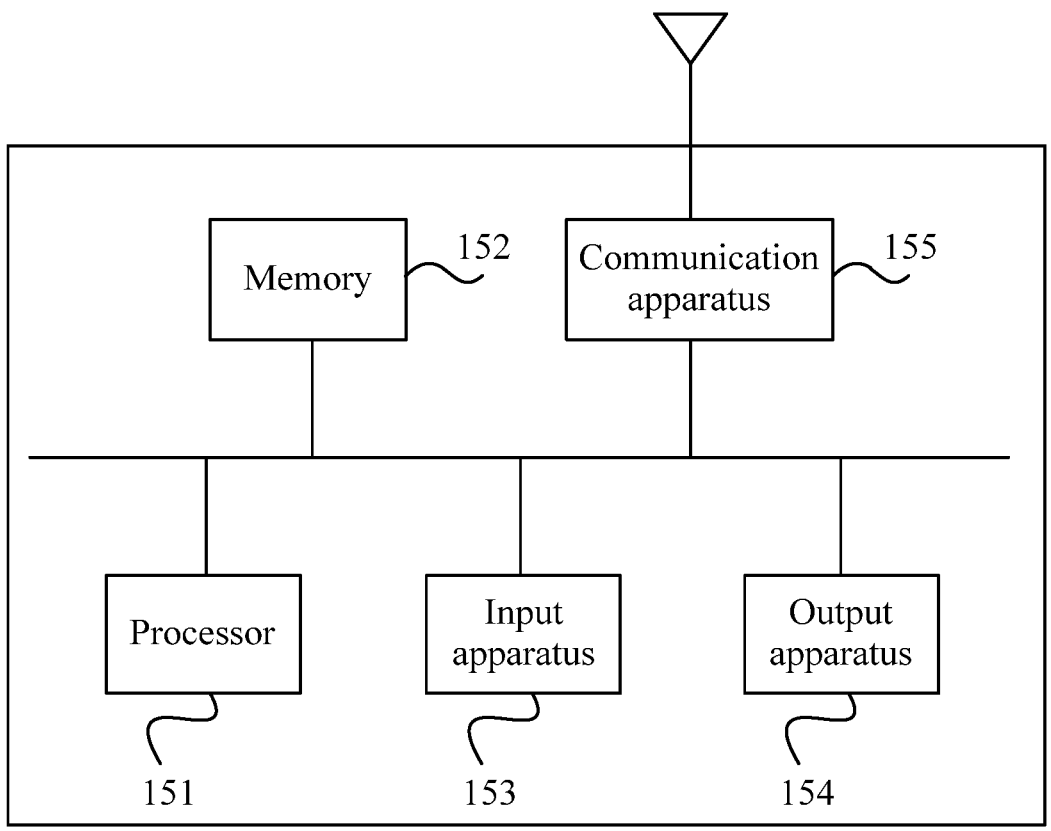
FIG. 15 is a diagram illustrating the structure of a device according to an embodiment of the present application.

An embodiment of the present application provides a device. FIG. 15 is a diagram illustrating the structure of a device according to an embodiment of the present application. As shown in FIG. 15, the device includes a processor 151, a memory 152, an input apparatus 153, an output apparatus 154, and a communication apparatus 155. One or more processors 151 may be disposed in the device, and one processor 151 is used as an example in FIG. 15. The processor 151, the memory 152, the input apparatus 153, and the output apparatus 154 in the device may be connected by a bus or other modes. Connecting by a bus is used as an example in FIG. 15.

As a computer-readable storage medium, the memory 152 may be configured to store software programs and computer-executable programs and modules, such as program instructions/modules (for example, the receiving module 121 and the configuration module 122 in the bearer configuration apparatus) corresponding to the bearer configuration method according to the embodiments of the present application, or such as program instructions/modules (for example, the first sending module 131 and the management module 132 in the context message management apparatus) corresponding to the context message management method according to the embodiments of the present application, or such as program instructions/modules (for example, the first releasing module 141 and the second releasing module 142 in the releasing apparatus) corresponding to the releasing method according to the embodiments of the present application. The processor 151 runs the software programs, instructions and modules stored in the memory 152 to perform function applications and data processing of the device, that is, to perform any method provided by the embodiments of the present application.

The memory 152 may include a program storage region and a data storage region, where the program storage region may store an operating system and an application program required by at least one function while the data storage region may store data created depending on the use of the device. Additionally, the memory 152 may include a high-speed random-access memory and may also include a nonvolatile memory, such as at least one disk memory, a flash memory, or another nonvolatile solid-state memory. In some examples, the memory 152 may include memories which are remotely disposed relative to the processor 151, and these remote memories may be connected to the device via a network. Examples of the preceding network include, but are not limited to, the Internet, an intranet, a local area network, a mobile communication network, and a combination thereof.

The input device 153 may be configured to receive inputted digital or character information and generate key signal input related to user settings and function control of the device. The output device 154 may include display devices such as a display screen.

The communication apparatus 155 may include a receiver and a transmitter. The communication apparatus 155 is configured to perform information transceiving communication under the control of the processor 151.

In the case where the preceding device is the first communication node, the processor 151 runs the programs stored in the system memory 152 to execute function applications and data processing, for example, the bearer configuration method provided by the embodiments of the present application is performed. The method is applied to the first communication node and includes the following.

First information is received, and a radio bearer of a multicast broadcast service (MBS) is configured based on the first information. The radio bearer includes a point-to-point (PTP) bearer and/or a point-to-multipoint (PTM) bearer.

The processor 151 may also perform the technical scheme of the bearer configuration information method provided by any embodiment of the present application. For the hardware structure and function of the device, reference may be made to the content description of this embodiment.

In the case where the preceding device is the second communication node, the processor 151 runs the programs stored in the system memory 152 to execute function applications and data processing, for example, a context message management method provided by the embodiments of the present application is performed. The method is applied to the second communication node and includes the following.

A context request message of a first communication node is sent. The context request message includes a context establishment request message and a context modification request message. A radio bearer of an MBS session is managed based on the context request message.

The processor 151 may also perform the technical scheme of the context message management method provided by any embodiment of the present application. For the hardware structure and function of the device, reference may be made to the content description of this embodiment.

In the case where the preceding device is the first communication node, the processor 151 runs the programs stored in the system memory 152 to execute function applications and data processing, for example, a releasing method provided by the embodiments of the present application is performed. The method includes the following.

In the case where a releasing condition is satisfied, a radio bearer associated with an MBS session is released; and an SDAP entity is released. The releasing condition includes one or more of the following: the MBS session ends; and first information is received. The first information carries an identifier of a to-be-released radio bearer.

The processor 151 may also perform the technical solution of the releasing method provided by any embodiment of the present application. For the hardware structure and function of the device, reference may be made to the content description of this embodiment.

An embodiment of the present application provides a storage medium including computer-executable instructions. The computer-executable instructions are configured to perform a bearer configuration method when executed by a computer processor. The method is applied to a first communication node and includes the following.

First information is received, and a radio bearer of a multicast broadcast service (MBS) is configured based on the first information. The radio bearer includes a point-to-point (PTP) bearer and/or a point-to-multipoint (PTM) bearer.

In the storage medium including computer-executable instructions provided by this embodiment of the present application, the computer-executable instructions may execute not only the preceding bearer configuration method operations but also related operations in the bearer configuration method provided by any embodiment of the present application.

An embodiment of the present application provides a storage medium including computer-executable instructions. The computer-executable instructions are configured to perform a context message management method when executed by a computer processor. The method is applied to a second communication node and includes the following.

A context request message of A first communication node is sent, where the context request message includes a context establishment request message and a context modification request message; and a radio bearer of an MBS session is managed based on the context request message.

In the storage medium including computer-executable instructions provided by this embodiment of the present application, the computer-executable instructions may execute not only the preceding context message management method operations but also related operations in the context message management method provided by any embodiment of the present application.

An embodiment of the present application provides a storage medium including computer-executable instructions. The computer-executable instructions are configured to perform a releasing method when executed by a computer processor. The method includes the following.

In the case where a releasing condition is satisfied, a radio bearer associated with an MBS session is released; and an SDAP entity is released. The releasing condition includes one or more of the following: the MBS session ends; and first information is received. The first information carries an identifier of a to-be-released radio bearer.

In the storage medium including computer-executable instructions provided by this embodiment of the present application, the computer-executable instructions may execute not only the preceding releasing method operations but also related operations in the releasing method provided by any embodiment of the present application.

From the preceding description of the embodiments, the present application may be implemented by means of both software and required general-purpose hardware, and also by means of hardware. The technical solutions of the present application may be essentially embodied in the form of a software product. The software product in a computer may be stored in a computer-readable storage medium such as a floppy disk, a read-only memory (ROM), a random-access memory (RAM), a flash memory, a hard disk, or an optical disc in the computer and includes several instructions for enabling a computer device (which may be a personal computer, a server, or a network device) to perform the method of the embodiments of the present application.

The term user terminal encompasses any appropriate type of radio user device, such as a mobile phone, a portable data processing apparatus, a portable web browser, or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). A computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A bearer configuration method, the method being applied to a first communication node and comprising:
receiving first information; and
configuring a radio bearer of a multicast broadcast service (MBS) based on the first information, wherein the radio bearer comprises at least one of a point-to-point (PTP) bearer or a point-to-multipoint (PTM) bearer;
wherein the first information comprises PTP bearer configuration information; and wherein configuring the radio bearer of the MBS based on the first information comprises: configuring the PTP bearer based on the PTP bearer configuration information, wherein the PTP bearer configuration information comprises: a PTP radio bearer identifier, MBS identifier information, and packet data convergence protocol (PDCP) configuration information; or
the first information comprises second information; and wherein configuring the radio bearer of the MBS based on the first information comprises: configuring the PTM bearer based on the second information, wherein the second information comprises second bearer configuration and the second bearer configuration comprises: a PTM radio bearer identifier, MBS identifier information, a logical channel identifier, and PDCP configuration information.

2. The method according to claim 1, wherein the PTP bearer configuration information further comprises at least one of following pieces of information:

service data adaptation protocol (SDAP) configuration information, or radio link control (RLC) bearer configuration information.

3. The method according to claim 2, wherein the SDAP configuration information comprises at least one of the following:
an indication indicating whether the radio bearer is a default radio bearer;
an indication indicating whether downlink data on the radio bearer has an SDAP header;
an indication indicating whether uplink data on the radio bearer has an SDAP header;
the MBS identifier information;
an uplink quality of service (QOS) flow list, in an MBS session, that is to be mapped to the radio bearer and to be added; or
a to-be-released QoS flow list, in an MBS session, that has been mapped to the radio bearer;
wherein the MBS identifier information comprises at least one of the following: an MBS session identifier, a temporary mobile group identity (TMGI) of the MBS, an MBS identifier, or a protocol data unit (PDU) session identifier indicating the MBS session;
wherein in a case where the PTP bearer configuration information carries the SDAP configuration information, at least one of following operations is performed:
establishing a first SDAP entity;
configuring the first SDAP entity based on the carried SDAP configuration information; or
establishing an association between the first SDAP entity and a radio bearer corresponding to the PTP radio bearer identifier,
wherein the first SDAP entity is configured to map a QoS flow in the MBS identifier information to a PTP radio bearer.

4. The method according to claim 2, wherein in a case where the PTP bearer configuration information comprises the SDAP configuration information, or PTM bearer configuration information comprises SDAP configuration information, at least one of following operations is performed:
establishing a third SDAP entity;
configuring the third SDAP entity based on the SDAP configuration information; or
establishing an association between the third SDAP entity and a radio bearer corresponding to the PTP radio bearer identifier or a radio bearer corresponding to the PTM radio bearer identifier,
wherein the third SDAP entity is configured to map a QoS flow in MBS identifier information to a PTP radio bearer or a PTM radio bearer.

5. The method according to claim 2, wherein the PDCP configuration information comprises at least one of the following:
indicating whether an encryption algorithm is used, timing of discarding a PDCP data packet, whether a PDCP entity continues or resets a robust header compression (ROHC) protocol in a case of reestablishment, header compression configuration, whether the radio bearer is configured with integrity protection, a maximum value of a header compression context identifier (CID) parameter, a PDCP entity being associated with more than one RLC entity in an uplink data transmission, allowing out-of-order, whether an uplink PDCP duplication is configured and activated, a downlink PDCP sequence number size, an uplink PDCP sequence number size, indicating a cell group identifier (ID) corresponding to a main RLC entity and a logical channel identifier corresponding to the main RLC entity in a case where more than one RLC entity is associated in an uplink data transmission, whether the radio bearer is configured to transmit a PDCP status report, reordering time, or a data volume threshold when uplink data uses a split bearer; and
wherein the RLC bearer configuration information comprises at least one of the following:
a logical channel identifier, a radio bearer identifier served by an RLC bearer, RLC configuration, logical channel configuration, an identifier indicating whether to reestablish RLC, a maximum number of retransmissions, a number of poll bytes, a poll PDU, a sequence number (SN)-field length, a timer in an RLC acknowledged mode (AM), a reassembly timer, or a status report timer.

6. The method according to claim 1, wherein
the second bearer configuration further comprises at least one of the following: SDAP configuration information or RLC bearer configuration information.

7. The method according to claim 6, wherein PTM bearer configuration information required for configuring the PTM bearer comprises at least one of the following: first bearer configuration or the second bearer configuration, wherein the first bearer configuration uses default configuration, and the first bearer configuration comprises at least one of the following: a PTM radio bearer identifier, a logical channel identifier, SDAP configuration information, PDCP configuration information, or RLC bearer configuration information.

8. The method according to claim 7, wherein in a case where the PTM bearer configuration information comprises the SDAP configuration information, at least one of following operations is performed:
establishing a second SDAP entity;
configuring the second SDAP entity based on SDAP configuration information of at least one of the first bearer configuration or the second bearer configuration; or
establishing an association between the second SDAP entity and a radio bearer corresponding to the PTM radio bearer identifier,
wherein the second SDAP entity is configured to map a QoS flow in the MBS identifier information to a PTM radio bearer.

9. The method according to claim 7, wherein all QOS flows of one piece of MBS identifier information are mapped to one PTM radio bearer, and different PTM radio bearers corresponding to different pieces of MBS identifier information use a same logical channel identifier.

10. The method according to claim 7, wherein all QoS flows of one piece of MBS identifier information are mapped to at least one PTM radio bearer, and different PTM radio bearers corresponding to a same piece of MBS identifier information use different logical channel identifiers.

11. The method according to claim 7, wherein for each piece of MBS identifier information, at least one of following operations is performed:
establishing a PDCP entity based on at least one of the first bearer configuration or the second bearer configuration;
establishing an RLC entity based on at least one of the first bearer configuration or the second bearer configuration;
configuring an MBS logical channel corresponding to the radio bearer in a media access control (MAC) entity; or establishing an association between a PDCP entity and an MBS logical channel;

wherein the MBS logical channel uses a default logical channel identifier.

12. The method according to claim 7, wherein for each PTM radio bearer identifier, at least one of following operations is performed:

establishing a PDCP entity;

establishing an RLC entity;

configuring an MBS logical channel corresponding to the each PTM radio bearer identifier in an MAC entity; or establishing an association between a PDCP entity and an MBS logical channel.

13. A device, comprising at least one processor; and a memory configured to store at least one program, wherein the at least one program, when executed by the at least one program, causes the at least one processor to perform the method according to claim 1.

* * * * *